United States Patent [19]
Hamada et al.

[11] Patent Number: 5,497,370
[45] Date of Patent: Mar. 5, 1996

[54] NETWORK SYSTEM

[75] Inventors: Takuji Hamada, Hitachiota; Masakazu Okada, Katsuta; Hiroshi Tomizawa, Hitachi, all of Japan

[73] Assignee: Hitachi, Ltd., Tokyo, Japan

[21] Appl. No.: 197,535

[22] Filed: Feb. 16, 1994

Related U.S. Application Data

[63] Continuation of Ser. No. 841,777, Mar. 2, 1992, abandoned, which is a continuation of Ser. No. 649,556, Feb. 1, 1991, abandoned, which is a continuation of Ser. No. 436,780, Nov. 15, 1989, abandoned.

[30] Foreign Application Priority Data

Nov. 16, 1988 [JP] Japan .................................. 63-287701

[51] Int. Cl.$^6$ .............................. H04J 3/16; H04L 12/56
[52] U.S. Cl. .......................... 370/60; 370/85.9; 370/85.5
[58] Field of Search ............................ 370/85.9, 85.1, 370/85.13, 16, 85.4, 85.5, 85.6, 85.12, 85.14, 100.1, 94.3, 105.1, 110.1, 67, 60, 94.1, 112, 85.7, 95.1; 340/825.5, 825.51, 825.52, 825.05, 827, 865.01, 825.03; 371/8.1, 11.1

[56] References Cited

U.S. PATENT DOCUMENTS

| | | | |
|---|---|---|---|
| 4,370,744 | 1/1983 | Hiramo et al. ............................ 370/16 |
| 4,445,214 | 4/1984 | Reynolds et al. ...................... 370/85.9 |
| 4,608,685 | 8/1986 | Jain et al. ................................ 370/85.9 |
| 4,637,013 | 1/1987 | Nakamara .............................. 370/85.4 |
| 4,698,802 | 10/1987 | Goke et al. ................................. 370/60 |
| 4,740,956 | 4/1988 | Hailpern et al. ..................... 370/110.1 |
| 4,748,560 | 3/1988 | Kataoka .................................. 370/85.9 |
| 4,852,091 | 7/1989 | Li ............................................ 370/85.1 |
| 4,897,841 | 1/1990 | Gang, Jr. ................................ 370/85.13 |
| 4,905,227 | 2/1990 | Lechner et al. ....................... 370/85.9 |
| 4,942,573 | 7/1990 | Woodward ............................. 370/85.9 |

FOREIGN PATENT DOCUMENTS

| | | |
|---|---|---|
| 57-111166 | 7/1982 | Japan . |
| 59-80041 | 5/1984 | Japan . |
| 61-174851 | 8/1986 | Japan . |

OTHER PUBLICATIONS

"Broadband Subscriber Loop System Using Multi–Gigabit Intelligent Optical Shuttle Nodes", N. Fujimoto et al., vol. 3, Nov. 1987.
"Multipurpose Optical Loop Network", K. Ohno et al., vol. 3, Nov. 1985.
"D–Net. A New Scheme for High Data Rate Optical Local Area Networks", C. Tseng et al., vol. 3, Dec. 1982.

Primary Examiner—Benedict V. Safourek
Assistant Examiner—Dang Ton
Attorney, Agent, or Firm—Antonelli, Terry, Stout & Kraus

[57] ABSTRACT

A network system includes a transmission line including a plurality of transmission channels, a plurality of transmission equipment connected to the transmission line to effect the transmission and reception of information between each other, and a plurality of devices connected to each of the transmission equipment, thereby effecting the transmission of information between the devices connected to the plurality of transmission equipment. Each of the transmission equipment includes a demultiplexing unit for separating an input signal from the transmission line into a plurality of receiving transmission channels, a channel switch unit for receiving the plurality of receiving transmission channels, outputting designated one of the transmission channels to one of the devices connected to the transmission equipment in question, and receiving transmitting information to form an information transmitting channel and combining it with other channels to be passed to form a plurality of sending transmission channels, and a multiplexing unit for receiving the plurality of sending transmission channels from the channel switch unit to multiplex and output the plurality of sending transmission channels.

27 Claims, 34 Drawing Sheets

PACKET CELL RECEPTION

FIG. 32
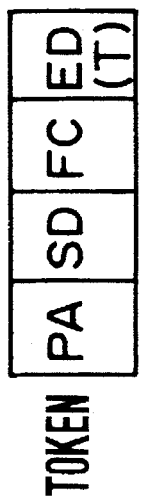
TOKEN
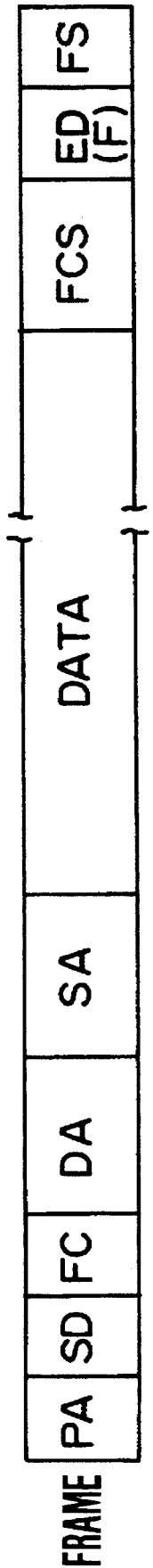
FRAME
PA: PREAMBLE
SD: START DELIMITER
FC: FRAME CONTROL
ED(T): END DELIMITER (TOKEN)
ED(F): END DELIMITER (FRAME)
DA: DESTINATION ADDRESS
SA: SENDING-END ADDRESS
DATA: DATA
FCS: FRAME CHECK SEQUENCE
FS: FRAME STATUS

NETWORK SYSTEM

This application is a continuation of patent application Ser. No. 07/841,777 filed on Mar. 2, 1992, now abandoned, which is a continuation of Ser. No. 649,556, filed on Feb. 1, 1991, now abandoned, which is a continuation of the parent application Ser. No. 436,780, filed Nov. 15, 1989, now abandoned.

BACKGROUND OF THE DISCLOSURE

1. Field of the Invention

The present invention relates to a transmission system for a network including a plurality of transmission channels, and more particularly to a network system well suited for the respective transmission equipment to effect the interchange of information between arbitrarily selected ones of the transmission equipment through the channels.

2. Description of the Prior Art

The transmission systems of this type have been discussed in the past in the program paper 1769 presented at the General National Convention of the Society of Electronic Communication, 1986, p 8–5 and the program paper 282 presented at the National Convention of the Information and System Department of the Society of Electronic Information Communication, 1987, p 2–13. Both of these papers propose to greatly increase the capacity of a network through the use of a transmission line including a plurality of low-speed transmission channels.

With the above-mentioned conventional techniques, no consideration has been made for the compatibility of the transmission equipment with cases where the network includes the single transmission channel and where the network includes the plurality of transmission channels and therefore there is a disadvantage that the existing transmission equipment cannot be reused when the transmission capacity of the network is increased.

SUMMARY OF THE INVENTION

It is an object of the present invention to provide means of increasing the transmission capacity of a network on the whole by using the transmission equipment each having a single transmission channel between it and the device connected thereto for the purpose.

The above object is accomplished by providing a transmission line including a plurality of channels, preliminarily assigning one of the receiving transmission channels to each of transmission equipment such that each of the channels has equal traffic to effect the transmission and reception of information and enabling the transfer of the transmitting information to the receiving transmission channel assigned to the destination transmission equipment.

Each transmission equipment is allowed not only to receive information through its preliminarily assigned single transmission channel for receiving purposes but also to transfer information to any other transmission equipment having its separate assigned transmission channel for receiving purposes. As a result, even if the existing transmission equipment each having the single transmission channel between its and various devices are used, each of the transmission equipment can transfer its transmitting information to the receiving transmission channel assigned to the destination transmission equipment thereby increasing the transmission capacity of a network on the whole.

BRIEF DESCRIPTION OF THE DRAWINGS

FIG. 32 shows a transmission format in the token pass control.

DESCRIPTION OF THE PREFERRED EMBODIMENTS

Figure 2:
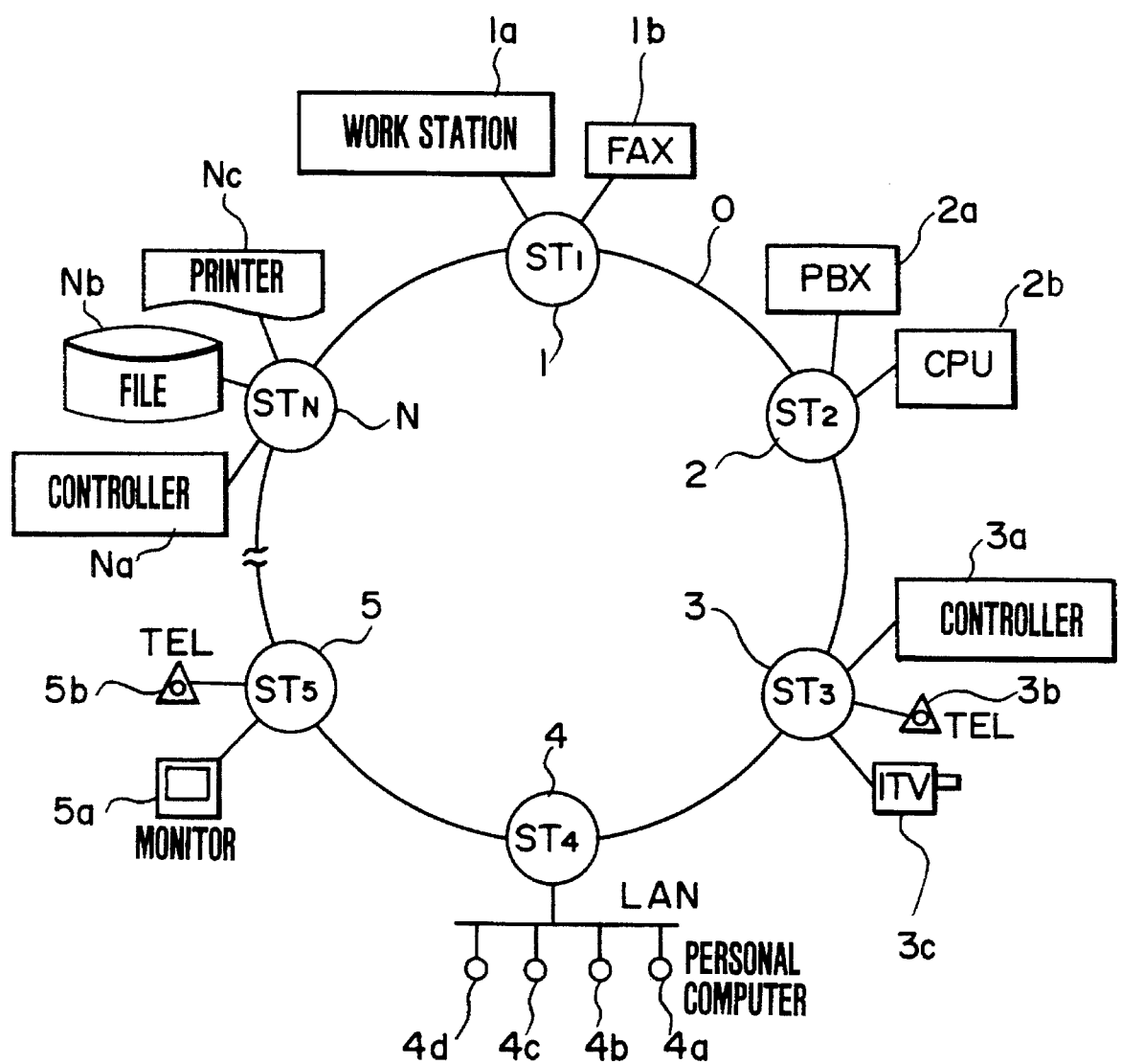
FIG. 2 is a diagram showing the construction of a ring network system.

An embodiment of the present invention will now be described with reference to FIG. 2. FIG. 2 shows an example of the construction of a ring network system to which the invention is applied. As shown in the Figure, various connected devices 1a to Nc scatteringly arranged at various places in a premises, e.g., a factory, building or campus are respectively associated with a network system through transmission equipment 1 to N thereby effecting the transfer of information among one another. In this case, the transmission equipment are connected by a bit-serial transmission line O in a ring form thereby forming a so-called ring network structure.

The system shown is a multi-media integrated network and it is capable of transmitting traffics of different characteristics in a mixed form. For instance, in the transmission of sound and picture media requiring long retension times and short transmission delay times, the transfer of information is effected periodically by using the preliminarily determined fixed transmission areas. As the corresponding connected devices, a FAX 1b, a PBX 2a, telephones 3b and 5b, a camera 3c and a monitor 5a may be cited. Also, in the transmission of data media requiring short retension times and subjected to loss restrictions in transmission delay time, the contention for the right to transmit is effected by use of the multiple access technique and then the transfer of information is made in burst form. As the corresponding connected devices, a work station 1a, a computer 2b, controllers 3a and Na, a branch local area network, a file Nb and a printer Nc may be cited.

With this type of network system, progress has been made toward enhancing the connected devices in performance and function and increasing the network scale and there has existed a demand for a network system which is higher in speed and greater in capacity than previously.

Figure 1:
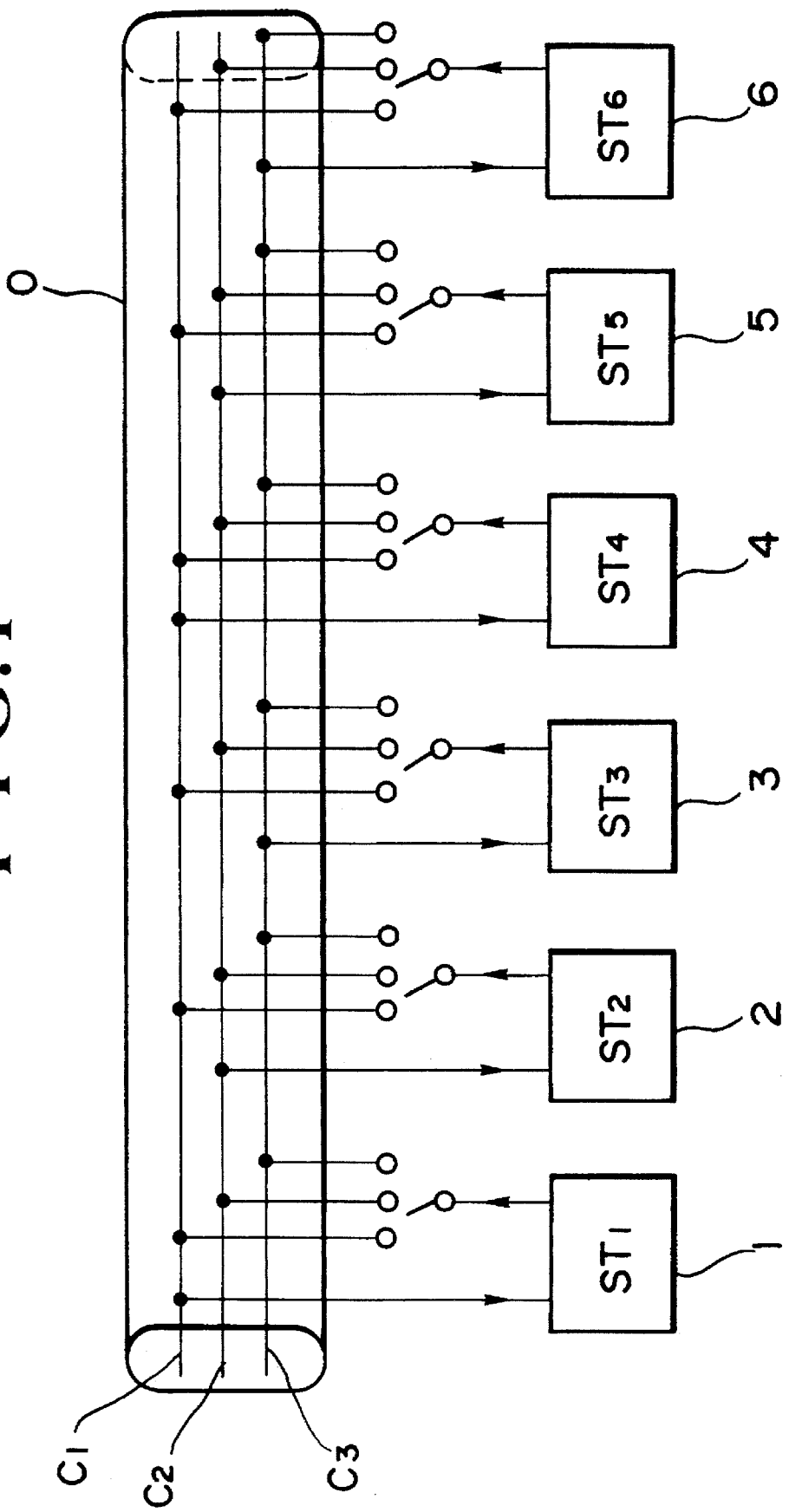
FIG. 1 is a diagram showing the concept of a transmission system representing a feature of the present invention.

Referring now to FIG. 1, there is shown the concept of a transmission system representing the features of the present invention. A transmission line O includes a plurality of transmission channels (in the embodiment the number of channels is 3, i.e., $C_1$, $C_2$ and $C_3$), each of transmission equipment 1 to 6 effects the reception of information through a certain fixed transmission channel and also effects the transmission of information by selecting the receiving transmission channel of associated one of the transmission equipment.

From the Figure it will be seen that the present invention has the effect of increasing the overall transmission capacity of the network system on the whole while limiting the transmission capacity of each transmission equipment to the band corresponding to each transmission channel.

As the multiplexing method for forming the plurality of transmission channels $C_1$, $C_2$ and $C_3$, any of the time division multiplexing, the wavelength multiplexing and the space multiplexing may be used and there is no particular limitation to the degree of multiplexing or the number of channels.

The channel selection during transmission is attained by detecting the proper receiving channel of the destination transmission equipment. Since the present case shows that the channel 1 is assigned for receiving purposes to the transmission equipment 1 and 4, the channel 2 to the transmission equipment 2 and 5 and the channel 3 to the transmission equipment 3 and 6, if, for example, the transmission equipment 1 is to transmit information to the transmission equipment 4, the channel 1 can be used to transmit; if the information is to be transmitted to the transmission equipment 3 it must contend for the sending right on the channel 3.

Figure 3:
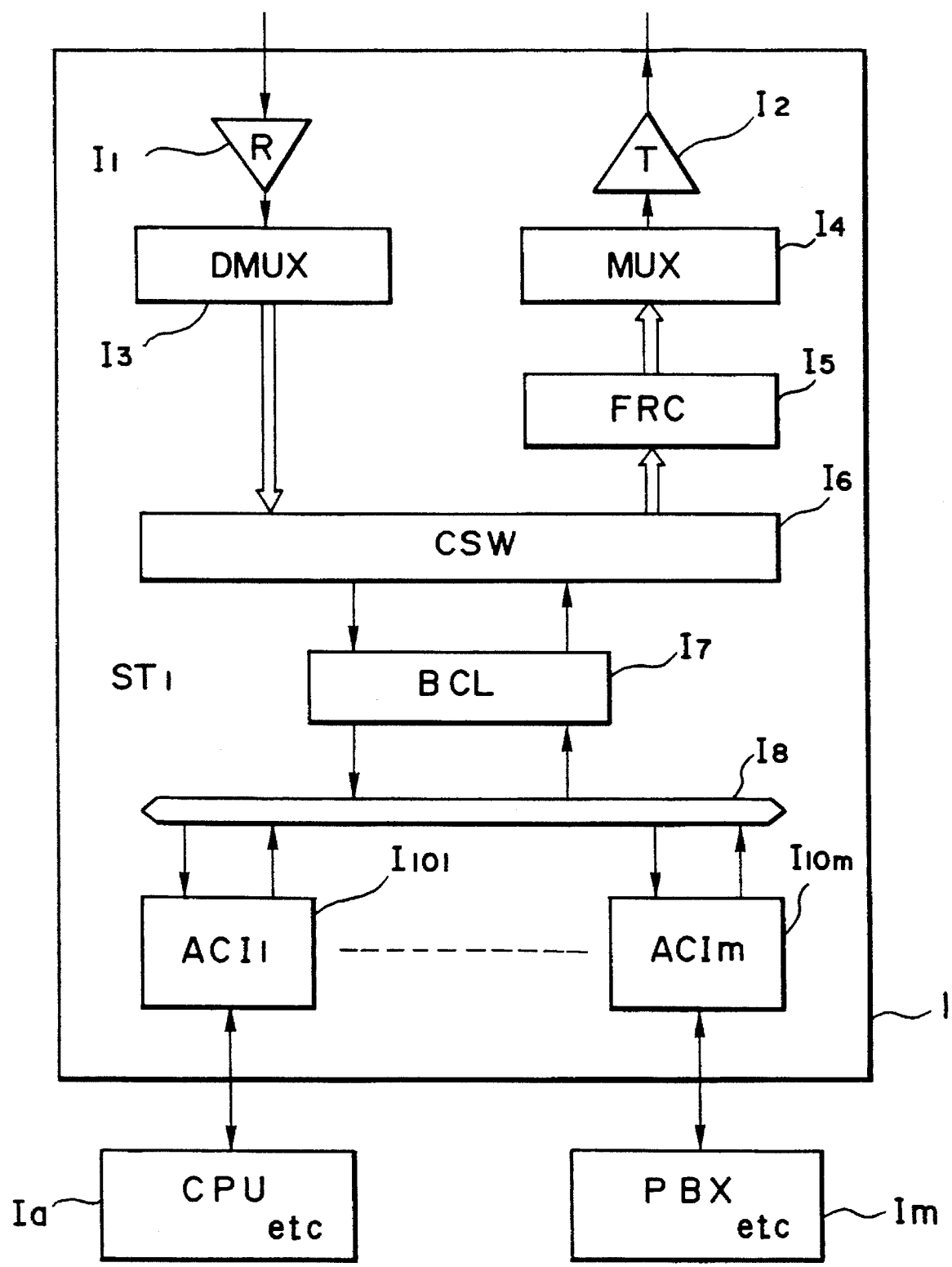
FIG. 3 is a block diagram showing the hardware of the ring network transmission equipment.

FIG. 3 is a block diagram showing the hardware of the transmission network for the ring network. Here, it is assumed that all the transmission equipment are identical in construction, that the transmission line shows an example of the single system type and that the multiplexing method is the time division multiplexing. The following functional blocks are used.

1) Receiving unit ($I_1$)

A unit for converting the signal on the transmission line to digital form and it serves various functions such as photo/electric conversion, signal amplification, timing extraction, digital regeneration and decoding.

2) Transmitting unit ($I_2$)

A unit for converting digital information to a transmission line signal and transmitting it conversely to the receiving unit and it serves such functions as coding, signal drive and electric/photo conversion.

3) Demultiplexing unit ($I_3$)

This unit has a function of separating the multiplexed information for the plurality of transmission channels. It also serves such functions as frame synchronization detection and interchannel phase adjustment.

4) Multiplexing unit ($I_4$)

Contrary to the demultiplexing unit, this unit multiplexes the plurality of transmission channels for conversion into a single high-speed information string.

5) Frame control unit ($I_5$)

This unit has various functions such as frame pattern generation, ring circulation delay time adjustment and deletion and regeneration of false circulation cells for the purpose of forming an STDM (synchronous time division multiplexing) frame. In the network, these functions are performed only in one of the transmission equipment and are not performed in the other transmission equipment thus allowing information to simply bypass.

6) Channel switching unit ($I_6$)

This unit performs the information switching between the plurality of transmission channels forming the transmission line and the sending and receiving channels used between the transmission equipment and the devices connected thereto.

7) Bus control unit ($I_7$)

This unit performs a bus control processing such that the transmission channel selected by the channel switch unit is parallely shared by a plurality of access interface units. In addition, it has a subcommunication channel forming function for intra-network management and network structure control purposes and a communication function.

8) Transmission bus unit ($I_8$)

This unit includes the respective parallel buses for the receiving data, transmitting data, various timing and consignals and microprocessor interfacing.

9) Access interface units ($I_{10}$)

These units perform interfacing between the connected devices and the transmission equipment to effect the transmission and reception of information. The access controls to the transmission channels are roughly divided into two types of packet control and circuit control in dependence on the types of traffic of information. The former performs the burst transmission and the latter performs the periodic transmission.

The basic information flow inside the transmission equipment 1 will now be described. The serial receiving signal is converted to a digital signal by the receiving unit $I_1$ and the signal is divided into the plurality of transmission channels and supplied to the channel switch unit $I_6$ by the demultiplexing unit $I_6$. The channel switch unit $I_6$ forms a single receiving transmission channel and sends it to the bus control unit $I_7$. The bus control unit $I_7$ outputs its input to the transmission bus unit $I_8$ so that it is received by the access interface units $I_{01}$ to $I_{0m}$ in the transmission equipment. When there is no transmission of information from these access interface units, the plurality of transmission channel information inputted to the channel switch unit $I_6$ are sent as such to the multiplexing unit $I_4$ via the frame control unit $I_5$ so that after multiplexing, the information is sent to the transmission line O by the transmitting unit $I_2$ and then transferred to the downstream-side transmission equipment. On the contrary, when any information is transmitted from the access interface units $I_{01}$ to $I_{0m}$, the transmitting information outputted to the transmission bus unit $I_8$ is sent through the bus control unit $I_7$ to the channel switch unit $I_6$ which in turn transfers the information to the suitable place of the plurality of transmission channels. At this tine, of the input information from the demultiplexing unit $I_3$, the information present in the transfer position is prevented from passing through the present transmission equipment and thus it is lost. The subsequent information path is as mentioned previously.

Figure 4:
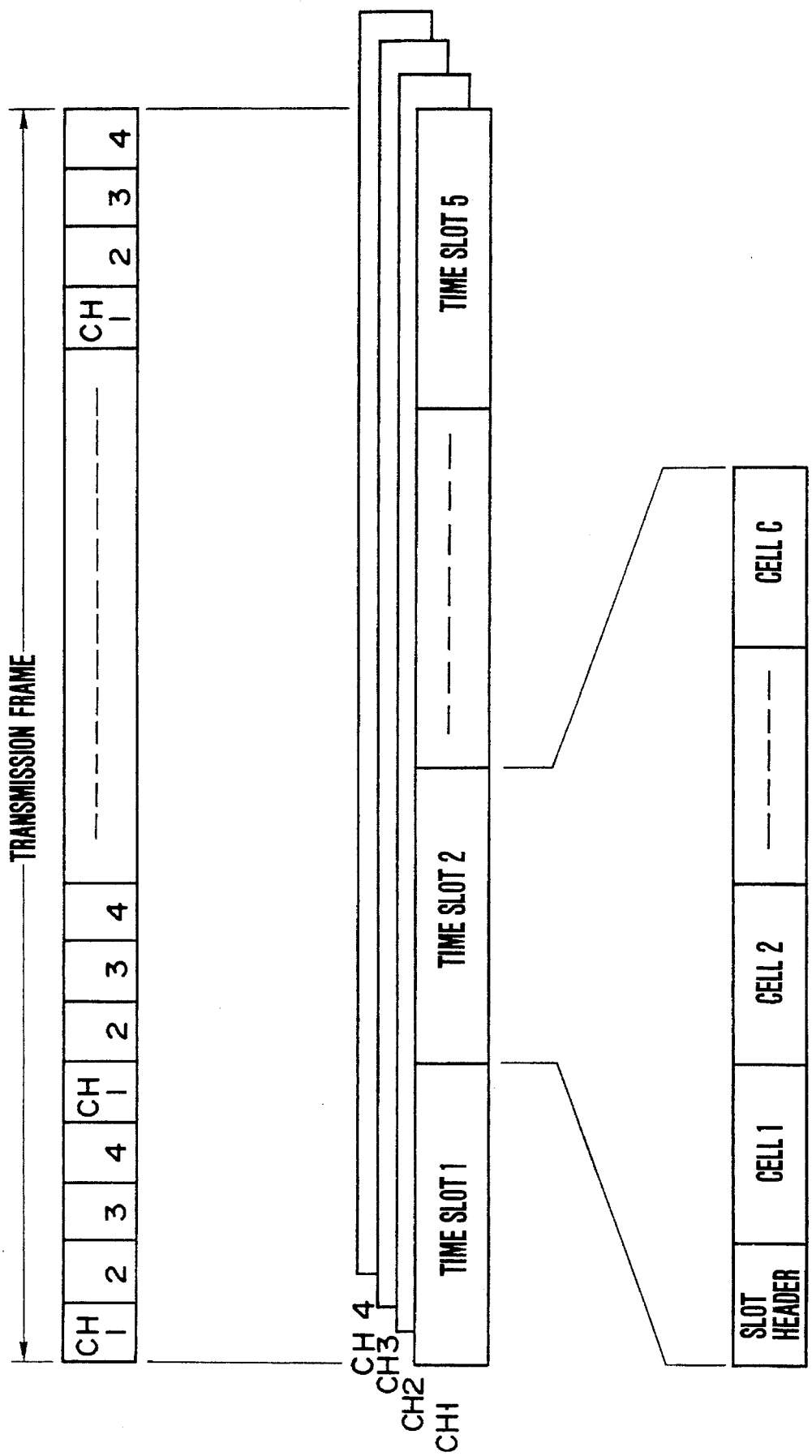
FIG. 4 shows the format of a multiplexing transmission frame.

FIG. 4 shows an example of the format of a multiplexing transmission frame and the format used is based on the NNI (network node interface) which is now investigated for use in the wideband ISDN (integrated services digital network) by the CCITT. The multiplexing on the transmission line O is effected in terms of bits or bytes and the frame length is 125 μsec. While, in this case, the degree of multiplexing is indicated as 4 by way of example, there is no limitation from the system point of view.

After the separation, each of transmission channels $CH_1$ to $CH_4$ has the same format and includes a plurality of time slots of the same length.

Also, each time slot includes a slot header and a plurality of cells of the same length. The header is used as a subcommunication channel for the purpose of frame synchronization as well as the previously mentioned intra-network management and network construction control. The transmission of information is effected by the portion of the cells so that in the case of the burst transmission, packet information is divided into the cells and are transmitted. On the other hand, while, in the case of the periodic transmission, there is no need to be conscious of the transmission in terms of cells, it is designed to conform with the burst transmission for purposes of simplicity.

Figure 5:
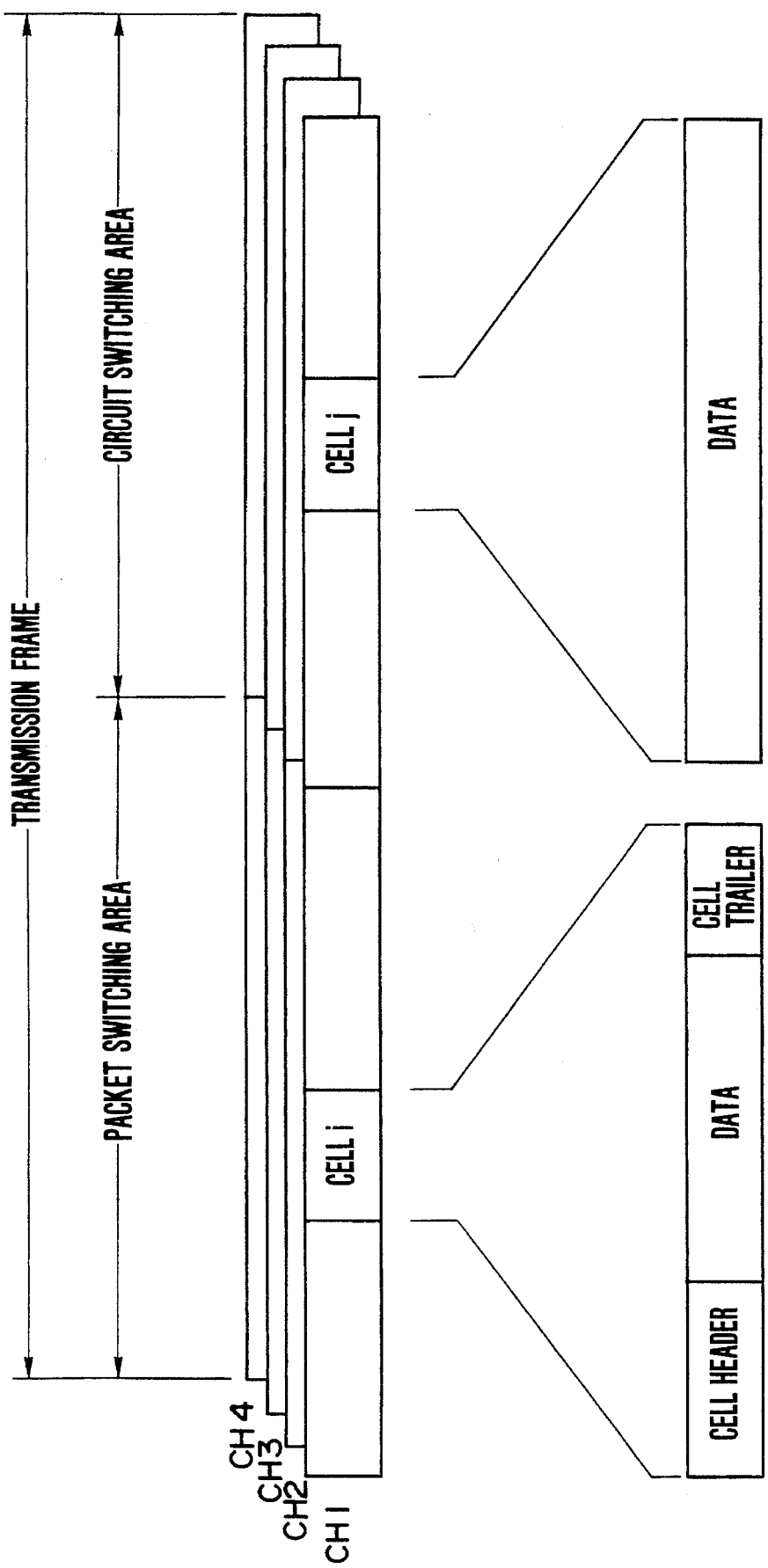
FIG. 5 is a diagram showing the allocation of the transmission channels.

FIG. 5 shows an example of a transmission region allocation for the packet and the circuit information in each of the transmission channels $CH_1$ to $CH_4$. In this case, the limiting condition is that the same allocation must be used for the transmission channels requiring the interchange of information therebetween.

While the allocation is such that the frame is divided into the two areas with the cell or slot position as the boundary, it may be of another form in which the two areas are mixed together in terms of cells. Also, though not shown, two of the channels are entirely used for packet transmission purposes and the remaining two are used for circuit transmission purposes. Of course, a mixed type of such channels is also possible.

While all the cells may be of the same format, in this case the cells of the two areas are of different forms so that the circuit cells are each composed of data only and the packet cells each requires header information in addition to data.

Figure 6:
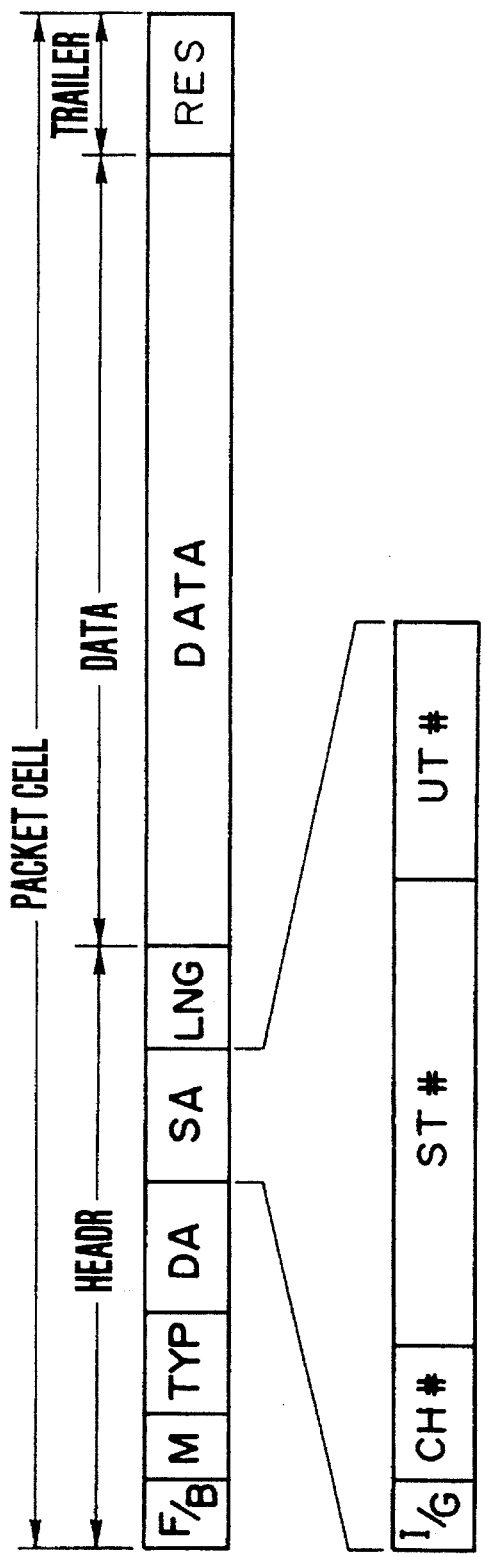
FIG. 6 shows a transmission format of the packet region cell.

FIG. 6 shows an example of a transmission format of the packet cells. The packet information is usually divided into a plurality of cells and transferred over the transmission line. However, each transmission channel is shared by the plurality of transmission equipment thus requiring an overhead for the purpose of multiple access in addition to a data area (DATA) which stores the packet information itself. These information are composed of the following.

1) F/B: Indicates the free/busy-condition of the cell in question.
2) M: This is the information for monitoring the false circulation of the cells through the ring.
3) TYP: Indicates the type of the cell when the packet is resolved into the cells and there are four types of "single", "head", "middle" and "final".
4) DA: The address information indicating the destination access interface unit.
5) SA: The address information indicating the source access interface unit.
6) LNG: Indicates the packet length and distinguishes the effective data portion in the cell.
7) RES: The response information from the destination access interface unit to the source.

Here, the address information SA has the following structure.

i) I/G: Distinction of the individual/general addresses.

ii) CH#: The number of the transmission channel used for the reception iii) ST#: The number of the transmission station.

iv) UT#: The number of the access interface unit in the transmission equipment.

By using such hierarchical address information, the selection of the destination transmission channel during the sending of packet information can be effected easily.

Figure 7:
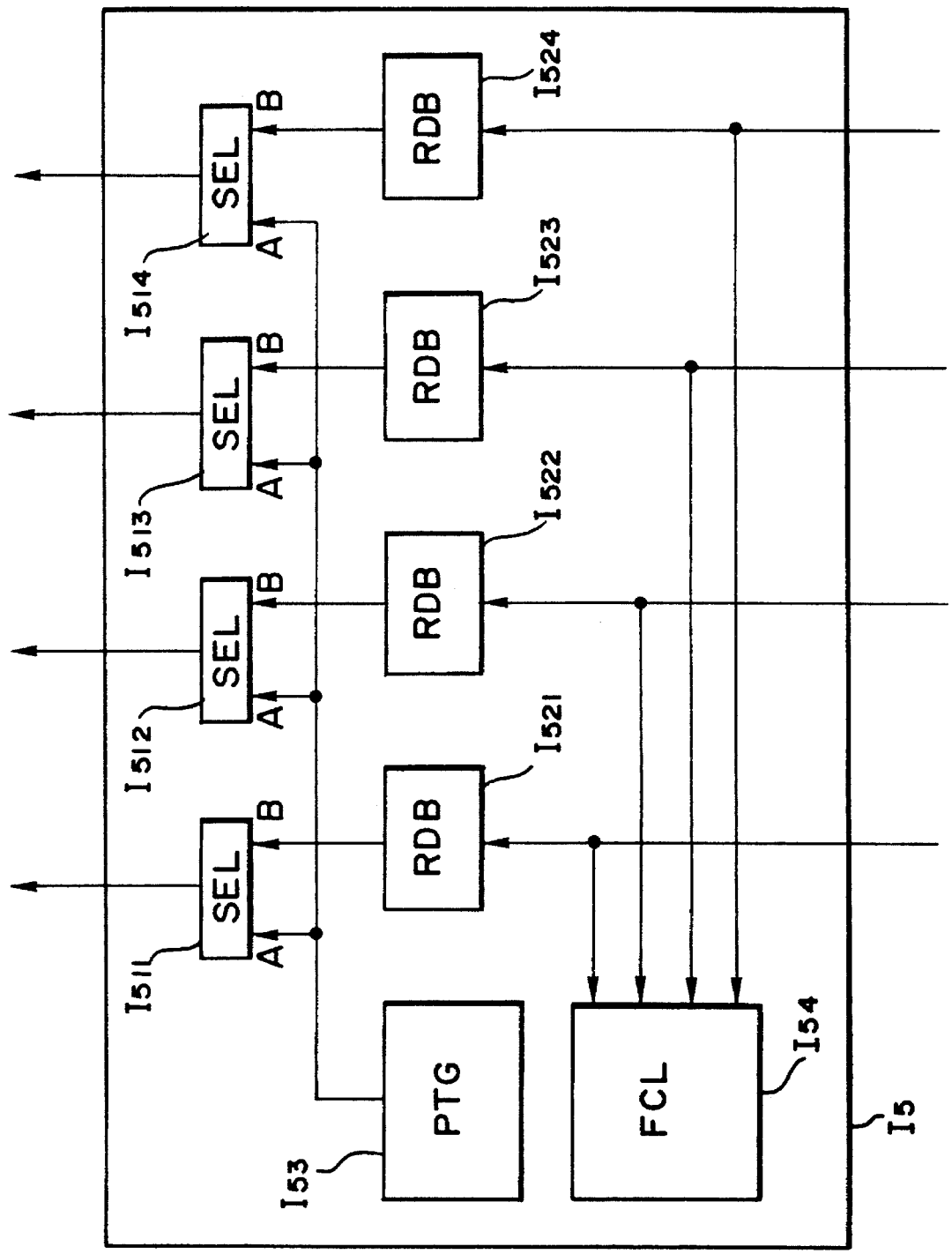
FIG. 7 is a block diagram showing the hardware of the frame control unit.

FIG. 7 is a block diagram showing the hardware of the frame control unit $I_5$. The frame generation, the ring circulation delay time adjustment, the false circulation cell detection, the initialization, etc., are performed and the blocks in the Figure perform the following functions.

1) Selectors ($I_{511}$–$I_{514}$)

One of the frame information from a pattern generating circuit $I_{53}$ and the frame information from a ring delay buffer $I_{52}$ is selected and supplied to the multiplexing unit $I_4$ by each selector.

2) Ring delay buffers ($I_{521}$–$I_{524}$)

Each buffer includes mainly a two-port memory and makes an adjustment such that the ring circulating time of a signal becomes a given integral multiple of the frame length.

3) Pattern generating circuit ($I_{53}$)

The initial patterns of a frame and cells are generated. The phases of the transmission channels are synchronized and the patterns are used in common by all the channels.

4) Frame control circuit ($I_{54}$)

The stored amount of transmission information in each ring delay buffer $I_{52}$ is adjusted. In addition, the presence of any false circulation cell in each of the channels is checked so that if any, it is initialized.

During the initial period of the system, one of the transmission equipment of the network starts operating as a master and a transmission frame is transmitted by its pattern generating circuit $I_{53}$. This function part in each of the other transmission equipment is stopped and is conditioned to pass the transmission frame. Thereafter, upon completion of the formation of the transmission frame, the selectors $I_{51}$ are caused to select the ring delay buffer outputs excluding the necessary portion thereby starting the transfer of information of the respective transmission equipment.

Figure 8:
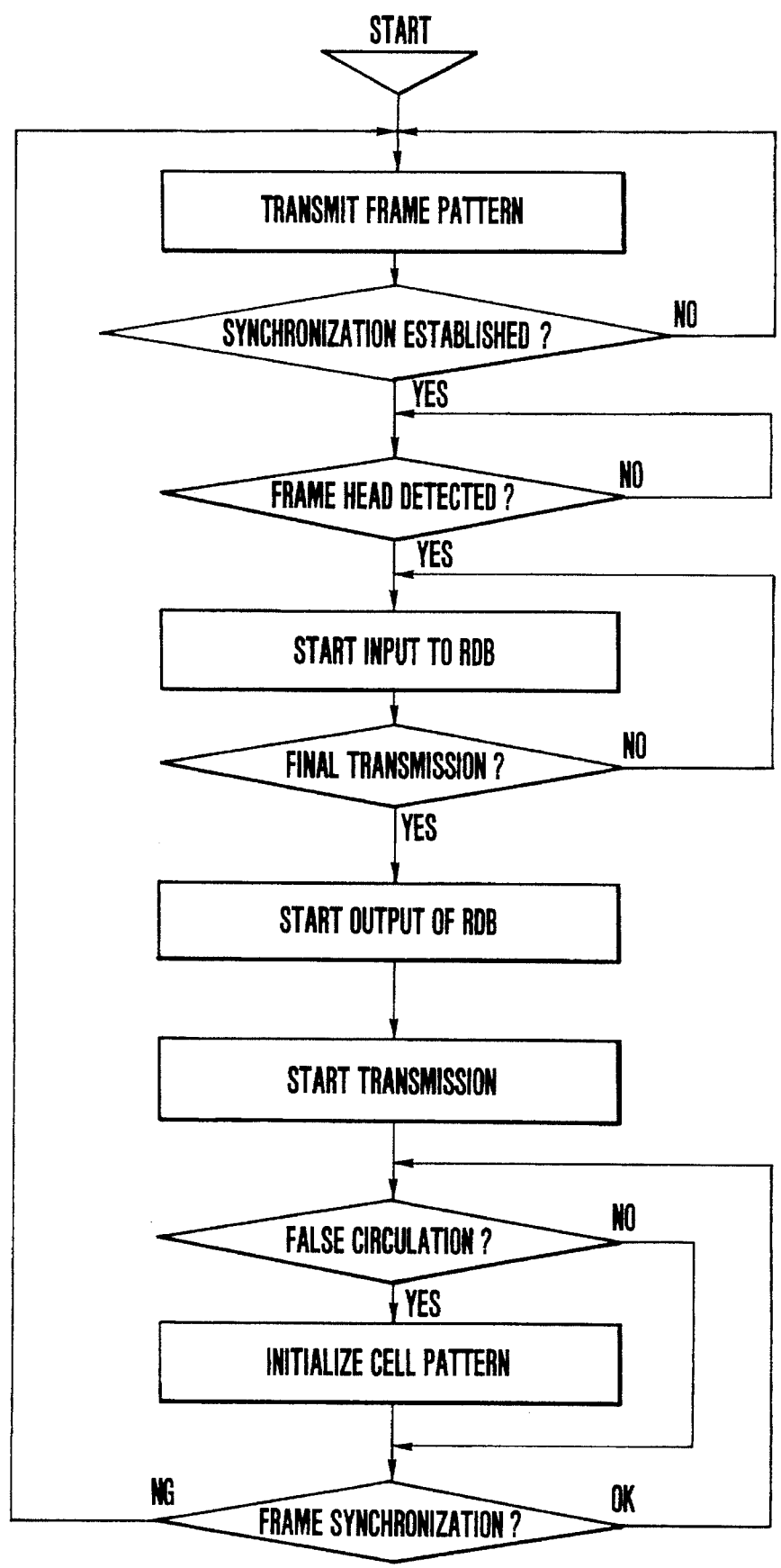
FIG. 8 is a flow diagram showing the operation of the frame control circuit.

FIG. 8 shows a brief operation flow of the frame control unit $I_5$ and the operation of the frame control unit $I_5$ will be described in greater detail with reference to the Figure.

i) During the initial period, in any one of the transmission equipment 1 to N which is selected as a master, the selectors $I_{51}$ of the frame control unit $I_5$ select the initial transmission frame information output generated from the pattern generating circuit $I_{53}$. (The A-side inputs are selected.)

ii) Thereafter, the information goes round the ring and appears at the inputs of the ring delay buffers $I_{52}$. However, the information is not taken into the buffers.

iii) After the frame synchronization has been established, the rounded information is applied to the ring delay buffer starting at the head. Since the outputs from the buffers are locked, the received information is stored up in the buffers.

iv) In this condition, when the transmission of the transmission frame from the pattern generating circuit is completed, the generation of the information from the ring delay buffers is simultaneously effected so that the selectors are conditioned to select the B-side inputs for the subsequent cell information to complete the transmission frame formation, thus starting the transfer of information from the respective transmission equipment.

v) Thereafter, the detection of false circulation cells is performed by the M information explained in connection with FIG. 6 and also a check for the presence of frame synchronization is effected.

Figure 9:
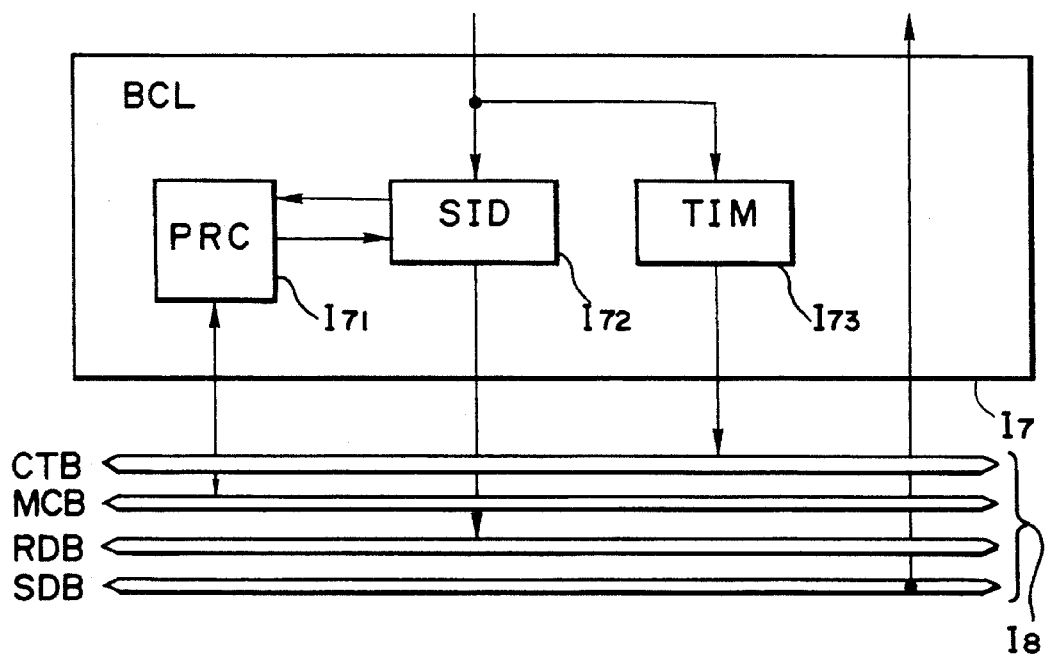
FIG. 9 is a block diagram showing the hardware of the bus control unit.

FIG. 9 is a block diagram showing the hardware of the bus control unit $I_7$ in which the transmission channel from the channel switch unit $I_6$ is converted to a structure which can be accessed by the plurality of access interface units $I_{01}$ to $I_{0m}$ in the transmission equipment. In addition, the necessary communication for the network management and the network structure control is performed by the internal processor.

To permit the accommodation of the plurality of access interface units $I_{01}$ to $I_{0m}$ in each of the transmission equipment 1 to N, the illustrated transmission buses $I_8$ are incorporated. These buses are classified into the following four types.

i) Receiving data bus (RDB)

The receive-only bus which simultaneously transmits information to all the access interface units.

ii) Sending data bus (SDB)

The sending-only bus and one of the access interface units is given the right to use it to send information.

iii) Control bus (CTB)

This bus controls such signals including various timing signals for informing the access interface units with the frame and cell positions, signals for transmission contention among the access interface units and resending request signals to the access interface units from the channel switch unit.

vi) Processor bus (MCB)

This bus allows the interchange of information between the microprocessor and the peripheral devices. The respective blocks serve the following functions.

1) Processing circuit ($I_{71}$)

This circuit includes mainly a microprocessor and peripheral LSIs and it enables the transfer of information between it and other function units. For instance, it performs the transmission of available area information on a transmission frame to the circuit access interface units through the processor bus and so on.

On the other hand, communication with the processors in the other transmission equipment is required for the network management, the network structure control and so on. This communication subchannel is provided by a subchannel inserting and eliminating circuit $I_{72}$.

2) Subchannel inserting and eliminating circuit ($I_{72}$)

A certain band in the slot header area of the transmission frame is assigned to the communication subchannel between the processing circuits and this circuit performs the operation of delivering the information of this area to the processing circuit and receiving the information conversely.

3) Timing generating circuit ($I_{73}$)

This circuit extracts the various transmission timing signals for the frame, cells, etc., from the receiving channel and supplies the signals to the access interface units.

Figure 10:
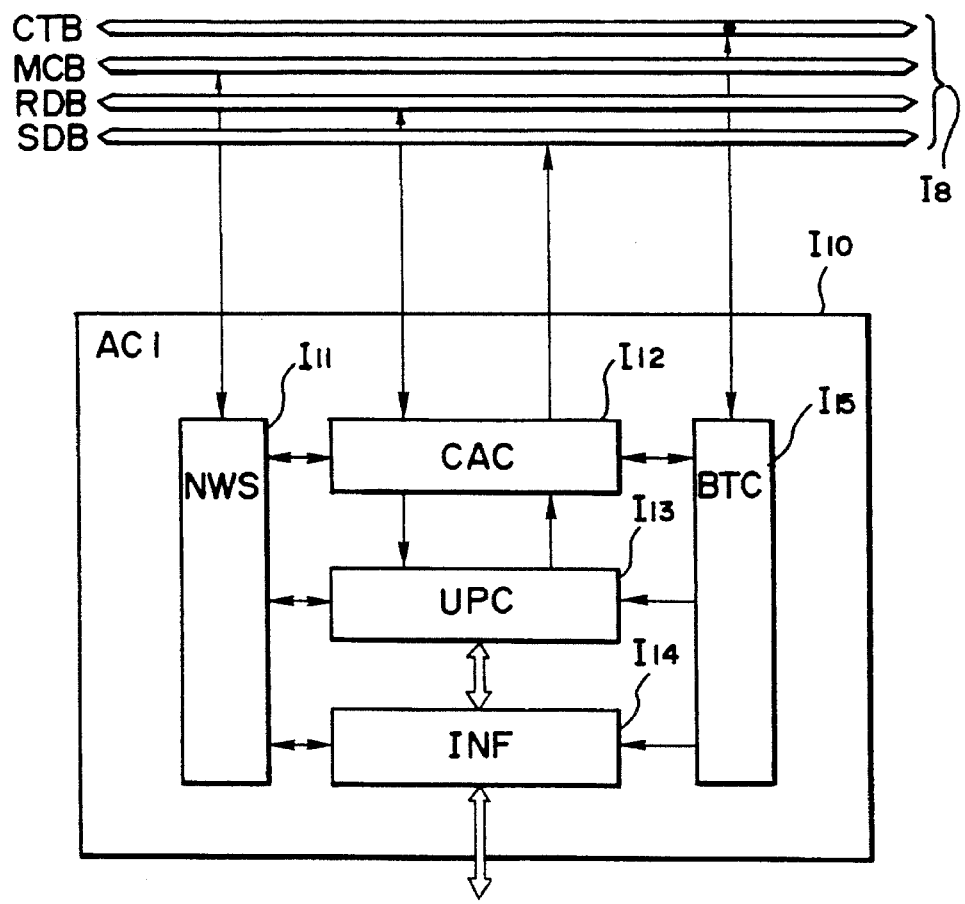
FIG. 10 is a block diagram showing the hardware of the access interface unit.

FIG. 10 is a block diagram showing the hardware of the access interface units $I_{10}$. Each unit performs the interfacing between the connected device and the transmission equipment and it also performs the transmission and reception of information through the transmission channels. The respective blocks serve the following functions.

1) Interfacing circuit ($I_{14}$)

This circuit performs the transfer of information between the transmission equipment and the connected device. The type of interfacing and the control method differ with the different connected devices.

2) Upper protocol processing circuit ($I_{13}$)

This circuit performs such communication processes as the buffer management, error control, flow control and sequential control. This function part is eliminated depending on the connected device.

3) Cell access circuit ($I_{12}$)

This circuit sends the communication information from the upper protocol processing circuit upon obtaining the right to send. Conversely, it serves the access control function of taking in the information on the transmission channel which is addressed thereto and transferring the information to the upper protocol processing circuit. In accordance with the traffic characteristics of transmission information to be handled, the access methods are classified into two types, i.e., packet access method and circuit access method. The access method for packet information includes a slot process, token passing process, etc., and in this case the slot access process is employed as shown in FIG. 6.

On the other hand, the method of preliminarily assigning fixed positions on a periodic transmission frame as transmission areas to each access interface unit, e.g., FA-TDMA (fixed assignment-time division multiple access) for the circuit information.

4) Network managing circuit ($I_{11}$)

This circuit performs the transfer of network management information for the above-mentioned function parts. The network management information include various fault information, operation mode settings, various transmission parameters, etc. Also, the interchange of these management information between this and other transmission equipment is also possible and the information are transferred through the processor bus, the processing circuit and the subcommunication channel.

5) Bus timing control circuit ($I_{15}$)

This circuit supplies transmission timing signals to the respective function parts and also performs the transfer of transmission control signals through the control bus. The former includes such timing signals as the frame, cell, byte and bit clocks and the latter include such signals as the data transmission mode indicator, packet access interface contention signal and retransmission request signal.

Figure 11:
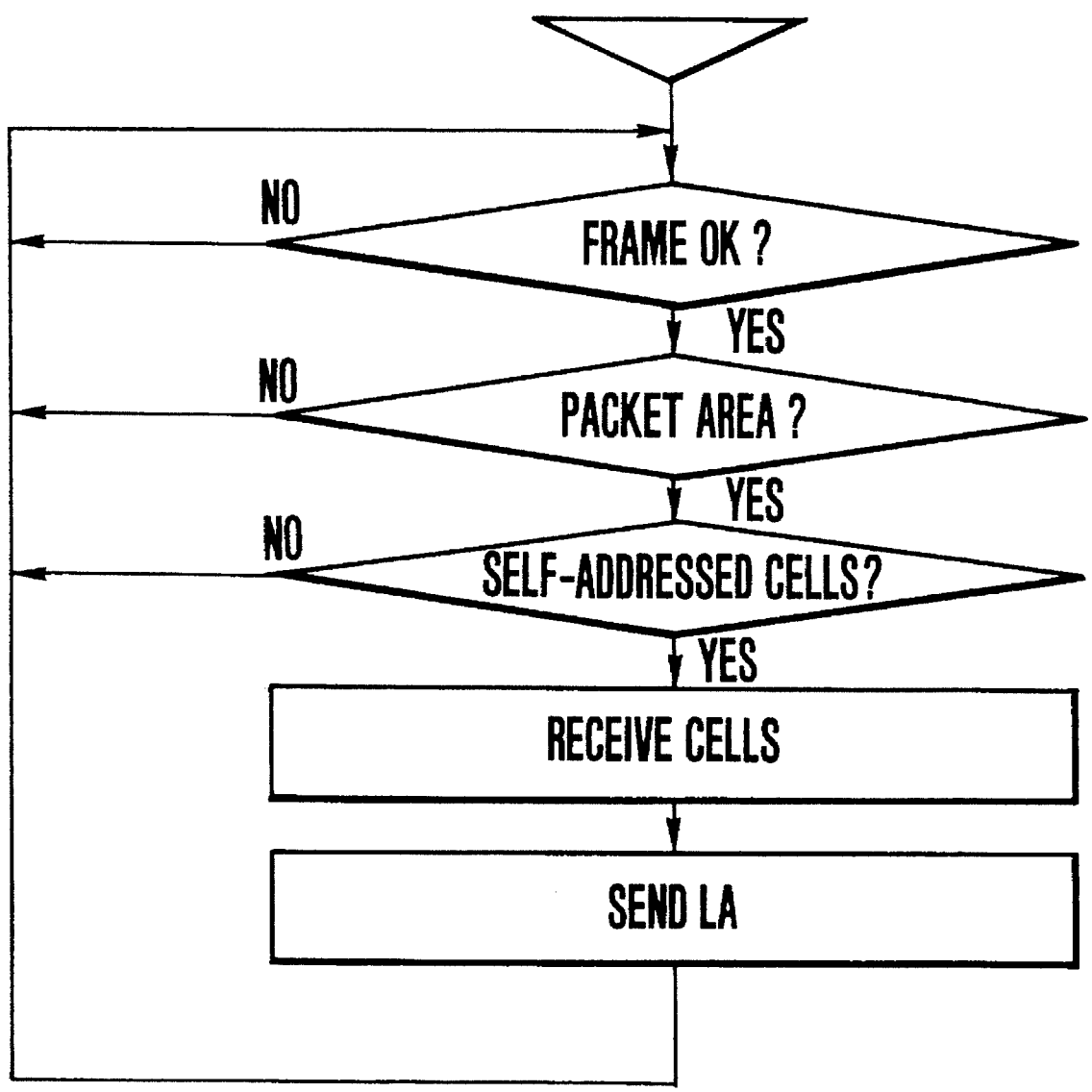
FIG. 11 is a receiving access flow for packet information.

FIG. 11 is a flow chart showing the receiving access process for packet information. In the normal condition of the transmission frame, the destination address part DA is checked with respect to each of the cells in the packet area to check whether it is addressed to the transmission equipment in question. Then, the contents of the cells directed thereto are copied and taken in and also the receiving status is written in the answer area LA in case of need.

Figure 12:
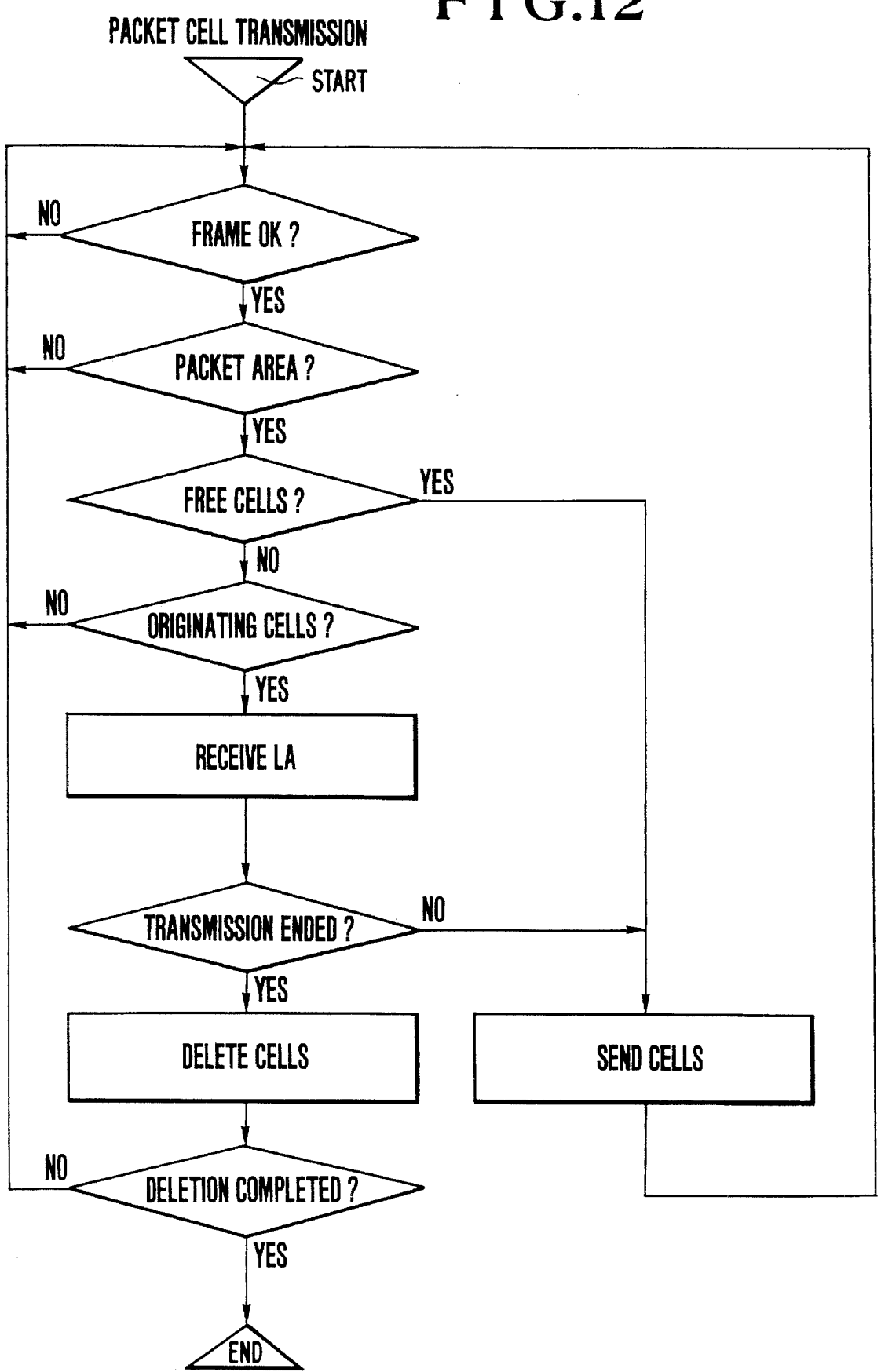
FIG. 12 is a transmitting access flow for packet information.

FIG. 12 is a flow chart showing the transmitting access process for packet information. When a request to send is generated so that it is now ready to send, the detection of the free cells (F/B=F) in the packet area of the normal transmission frame and the originating cells rounding the ring is effected and the transmission of information is effected. Note that in the latter case, the response signal (RES) from the designated receiving-end is received simultaneously. When the transmission of information is completed, all of the originating cells rounding the ring are restored to the free state, thereby completing the sequence of operations.

Figure 13:
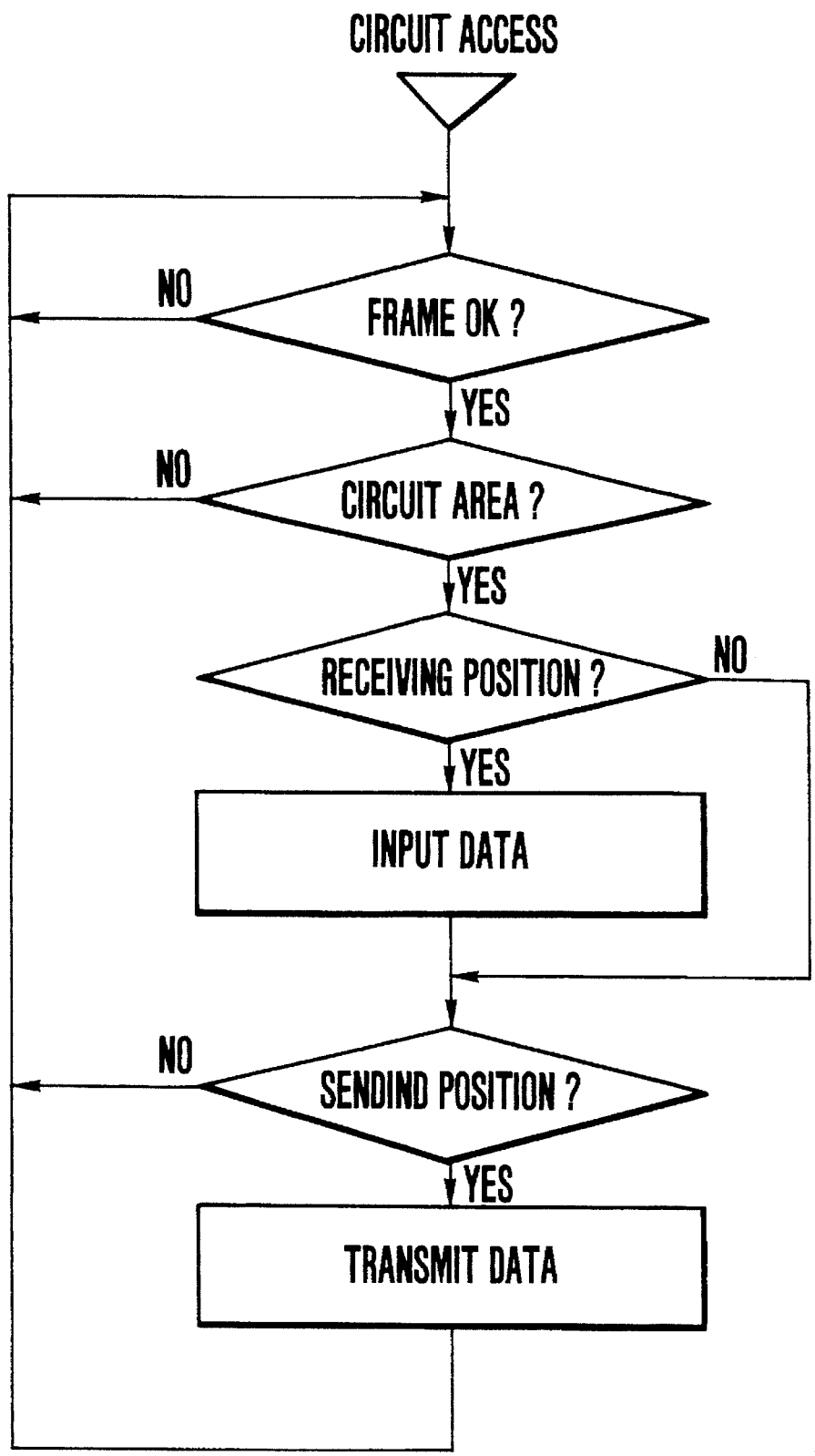
FIG. 13 is an access flow for circuit information.

FIG. 13 is a flow chart showing the access operation for circuit information. When the positions and amount of transmission are designated by the network management circuit $I_{11}$, these positions are detected in the circuit area of the normal frame and the transmission and reception of data are performed. The transmitting and receiving positions may be either the same or different from each other.

Figure 14:
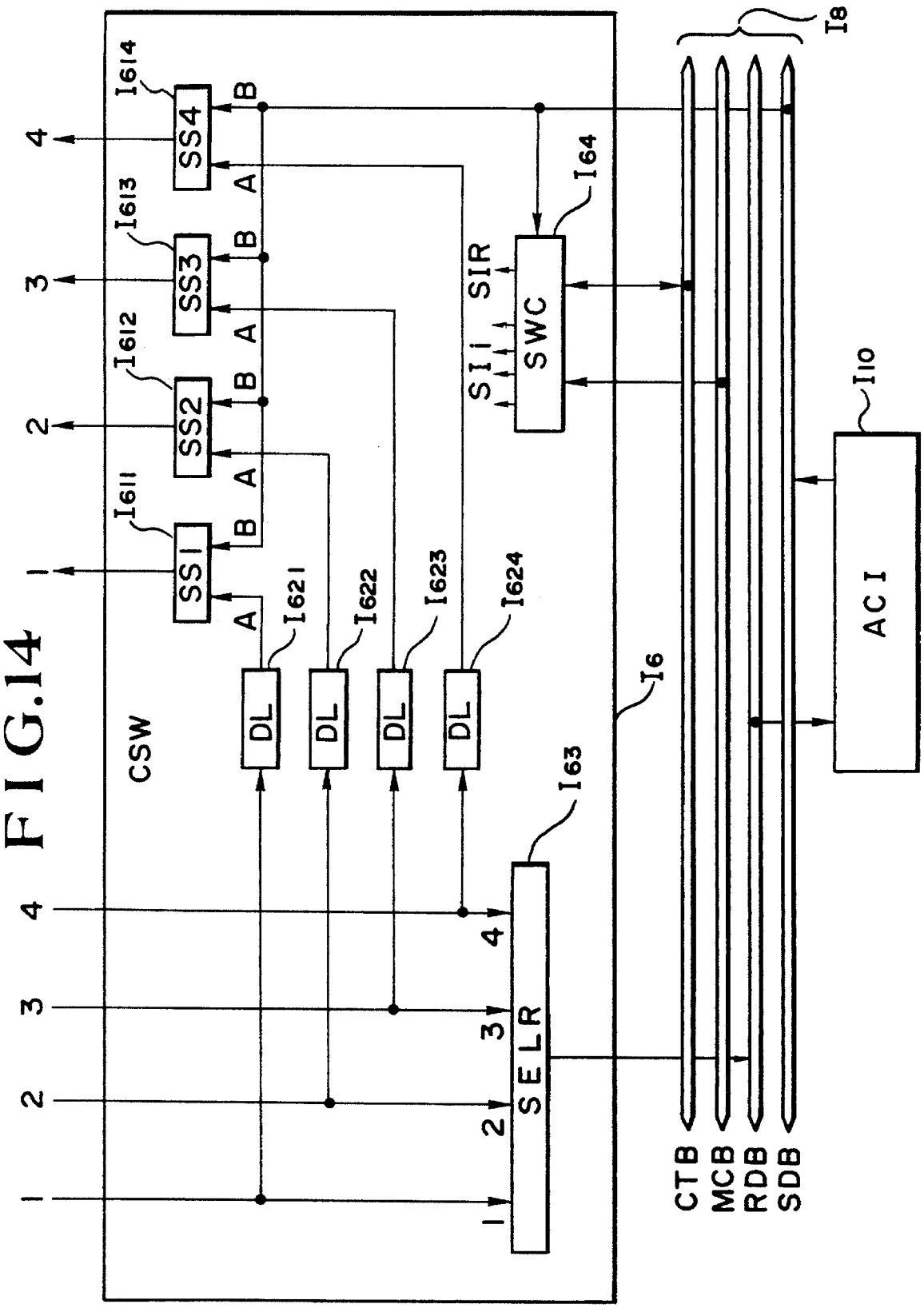
FIG. 14 is a block diagram showing the hardware of the channel switching unit.

FIG. 14 is a block diagram showing the hardware of the channel switch unit $I_6$ and it effects the interchange of information between the transmission channels $CH_1$ to $CH_4$. It includes the following function blocks.

1) Receiving selector ($I_{63}$)

This extracts the single receiving channel assigned to the transmission equipment 1 from the plurality of transmission channels $CH_1$ to $CH_4$ and uses it for the information receiving or transmitting contention.

2) Sending selectors ($I_{611}$: $I_{612}$, $I_{613}$, $I_{614}$)

These are provided one for each of the transmission channels to perform the gate function of passing the information from the corresponding receiving channel or passing the information transmitted by the access interface unit $I_{10}$.

3) Delay circuits ($I_{621}$: $I_{622}$, $I_{623}$, $I_{624}$)

These circuits perform the passing information delaying operation required for the selecting operation of the transmitting selectors $I_{61}$. This is due to the fact that the transmission of information for the access interface unit ($I_{10}$) requires to delay the signal and the amount of delay is the same as that of the signal delay.

4) Switch control circuit ($I_{64}$)

This circuit generates selecting signals (SIi) for the receiving selectors and a selecting signal (SIR) for the receiving selector.

The plurality of transmission channel information from the demultiplexing unit $I_3$ are supplied to the receiving selector $I_{63}$ and also to the sending selectors $I_{61}$ through the delay circuits $I_{62}$. In response to the command from the switch control circuit $I_{64}$, the receiving selector $I_{63}$ selects the information corresponding to the assigned receiving transmission channel and outputs it to the receiving data bus (RDB) of the transmission bus unit $I_8$. It is to be noted that while there is in fact the intervention of the bus control unit $I_7$ it is not explained for purposes of simplification. Since it is arranged so that the information outputted from the sending data bus (SDB) is supplied to one input of each of the sending selectors, the information can be sent to any one of the transmission channels.

Figure 15:
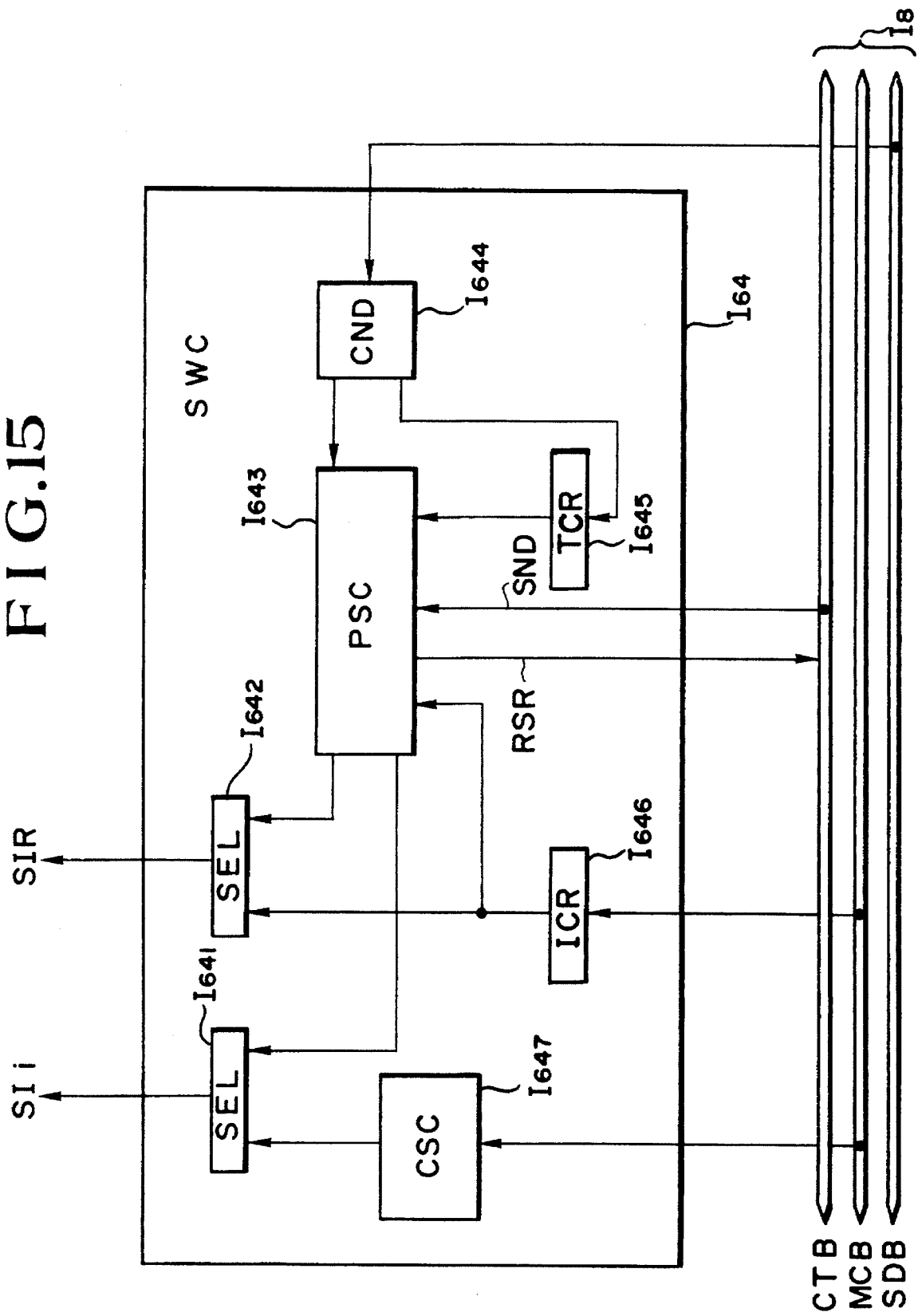
FIG. 15 is a block diagram showing the hardware of the switch control circuit.

FIG. 15 is a block diagram showing the hardware of the switch control circuit $I_{64}$. The method of information interchanging between the transmission channels differs depending on whether it is a packet or circuit information and therefore the blocks of this circuit include two systems of hardware in mixed form. The functions of these blocks are as follows.

1) Sending selecting signal selector ($I_{641}$)

In response to the timing of the packet or circuit cells preliminarily established in a given frame, the supply source of the sending selector ($I_{61}$) selecting signals SIi is switched from one to the other. One is a packet switching control circuit $I_{643}$ and the other is a circuit switching control circuit $I_{647}$.

2) Receiving selecting signal selector ($I_{642}$)

Depending on the packet or circuit cells, the supply source of the receiving selector ($I_{63}$) selecting signal SIR is switched from one to the other as in the case of 1). One is the packet switching control circuit $I_{643}$ and the other is a receiving channel number register $I_{646}$.

3) Receiving channel number register ($I_{646}$)

This register stores the number of the transmission channel preselected to be used permanently for information receiving purposes. While the preselection is effected by a network management server, it is effected more directly by the processing circuit $I_{71}$ of the bus control unit $I_7$ through the control bus CTB of the transmission bus unit $I_8$.

4) Transmitting channel number storage register ($I_{645}$)

This register temporarily stores the number of the transmission channel to which the destination transmission equipment is connected for packet transmitting purposes.

5) Channel number detecting circuit ($I_{644}$)

In accordance with the destination information DA of the packet cells, this circuit detects the transmission channel to which the destination transmission equipment is connected. During the packet transmission, the access interface unit occupies the transmission bus unit $I_8$ until the transmission of all the divided cells is completed properly and therefore the present circuit is required only to detect and inform the packet switching control circuit $I_{643}$ of the fact that the first packet cell transmission has been started. In addition, its value is stored in the transmitting channel number storage register.

6) Packet switching control circuit ($I_{643}$)

This circuit controls the inter-channel switching of the packet information cells. More specifically, the transmission channel to be connected to is determined according to the destination of the packet cells sent from the intra-transmission equipment access interface unit and selecting signals SIR and SIi for the receiving selector $I_{63}$ and the sending selectors $I_{61}$, respectively, are generated. In addition, included among those signals which are inputted and outputted from the function blocks are the sending packet leading cell number detection signal from the channel number detecting circuit, the contents of the receiving channel number register and the transmitting channel number storage register, the busy-condition signals SND from the sending access interface units and the resending request signals RSR to the same units (these signals are both transferred through the control bus CTB of the transmission bus unit), etc. Also, the transmission timing signals from the control bus CTB are received to generate the signals SIR and SIi only for the packet region established in the frame.

7) Circuit switching circuit $I_{647}$

This circuit performs the switching control required for sending the circuit information transmitted from the intra-transmission equipment access interface units to the transmission channel connected to the access interface units of the destination transmission equipment. Note that the destination channel information is preliminarily stored in this circuit. Its preset path is from the network management server to the present circuit through the intra-transmission equipment processing circuit and the processor bus MCB of the transmission bus unit.

Figure 16:
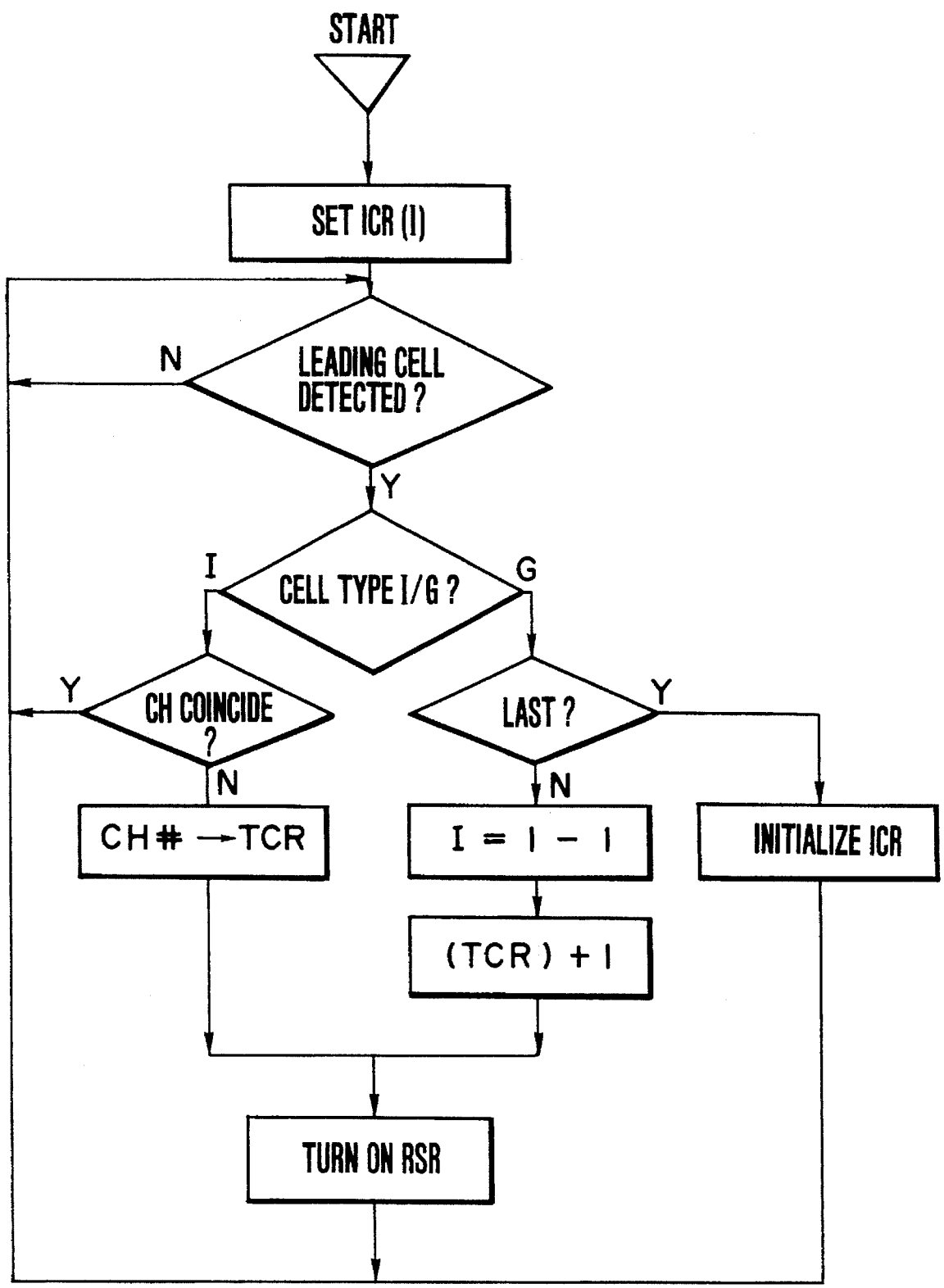
FIG. 16 is a flow diagram showing the operation of the packet switching control circuit.

FIG. 16 is a flow chart showing the operation of the previously mentioned packet switching circuit.

After the number of receiving channels NC in the construction of this network system has been stored initially, it is waited until the channel number detecting circuit $I_{644}$ reports the detection of the leading cell of the packet transmitted from the intra-transmission equipment access interface unit. The channel number detecting circuit $I_{644}$ always checks the destination address of the packet shown in FIG. 6. It is designed so that when this cell is free, all-zero information (null address) is for example written into the destination address part and thus the presence of any other value indicates the existence of the transmitting information. Also, whether the packet cells are those sent from the transmission equipment in question can be similarly determined by checking the transmission equipment number of alternatively it is possible to detect the busy-condition signal SND in the control bus CTB. Assuming that the latter method is used in this case, particularly worthy of notice are the individual address/general address part I/G and the transmission channel number CH#.

The processing to follow differs depending on whether the destination address is the individual destination or the general destination. Each of the two cases will now be described in detail.

In the case of the individual destination I, it is confirmed whether there is the equality between the content stored in the transmitting channel number storage register $I_{645}$ and the number of the transmission channel requested by the current transmission. The content stored in the transmitting channel number storage register is the channel number used in the preceding transmission and presently the acquisition of the sending right is looked for by this channel. Therefore, if the two are equal, it is only necessary to just continue the transmission and complete it. If the two are not equal, the channel is changed and the retransmission of the packet is effected. The change of the channel is effected by setting the transmission channel number CH# in the transmitting packet cell in the transmitting channel number storage register. Once started, the transmission may be continued to the end or it may be interrupted on the way. The retransmission of the packet is effected by sending a resending request signal RSR to the presently transmitting access interface unit through the control bus CTB.

As regards the transmitting method upon the detection of the unequality, in addition to the present embodiment, it is conceivable to use for example the method of storing all the packet information sent so that the switching to the proper channel is effected by the channel switch unit CSW thereby effecting the retransmission.

A description will now be made of the case of the general transmission G where the destination address is directed to all the transmission equipment.

With this embodiment, in the case of the general transmission G the information in question is sent in sequence by the contention of the transmission right for the transmission channels thereby transferring it to all the transmission equipment. By so doing, it is possible to reduce the complication of the controls, such as, the provision of a general transmission part in the packet area and the dynamic allocation of it along with the individual transmission part. In fact, the transmission is started from the channel stored in the transmitting channel number storage register $I_{645}$ and a request for the retransmission of the information is made to the corresponding access interface units by the resending request signals RSR.

From the foregoing description it will be seen that it is so constructed that the access interface units $I_{10}$ secure the use right on the transmission bus unit $I_8$ until the transmission of the information is completed properly.

Figure 17:
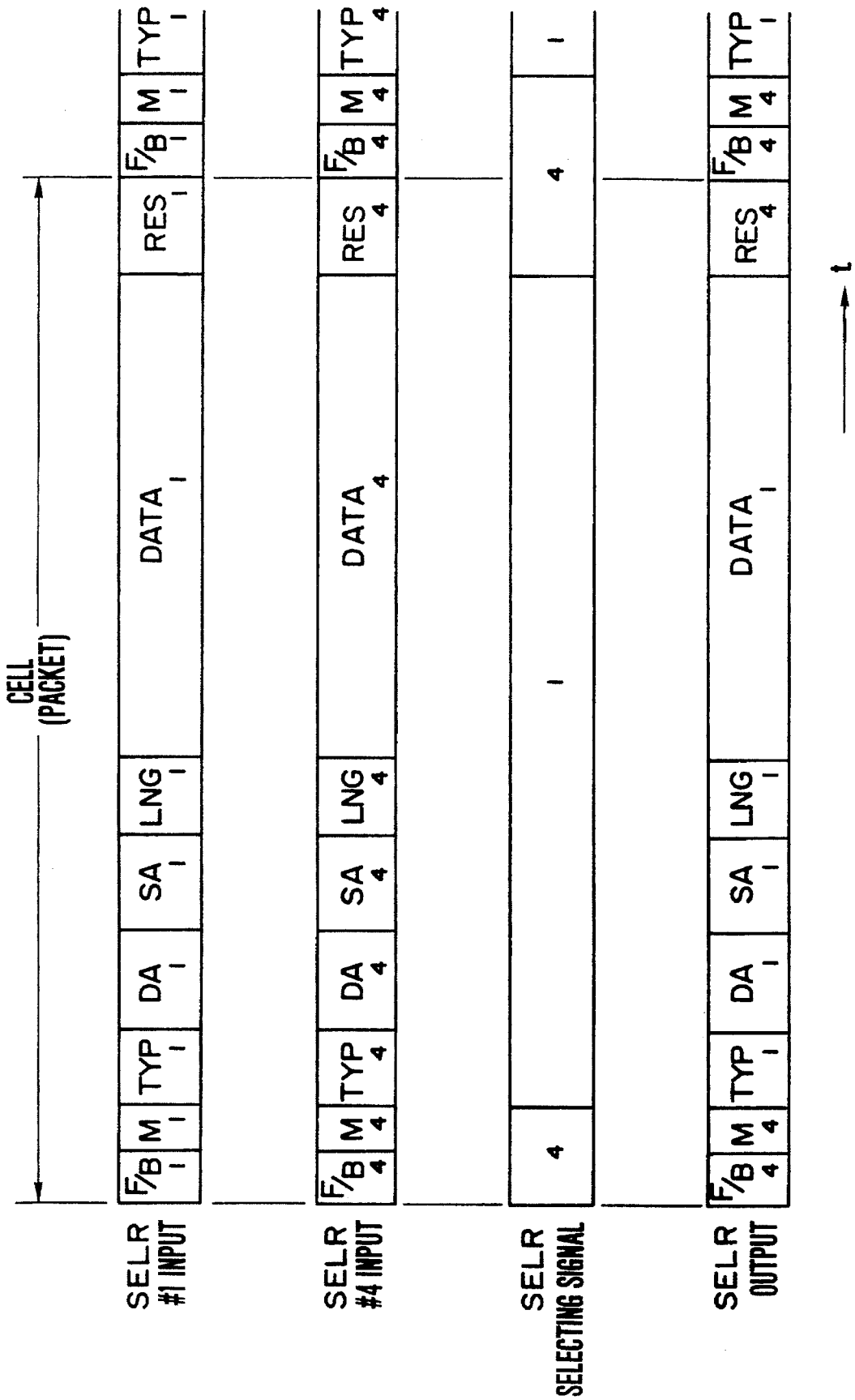
FIGS. 17, 18 and 19 are packet cell switching timing charts.

FIG. 17 is a packet cell reception switching time chart of the packet switching control circuit $I_{643}$. The packet switching control circuit $I_{643}$ controls the receiving selector $I_{63}$ and the sending selectors $I_{61}$ through the selectors $I_{642}$ and $I_{641}$, respectively. The switching operations of the various blocks of the channel switch unit $I_6$ will now be described in detail.

The description will be made with reference to a case in which the number of channels is set to 4, the receiving channel number of the present transmission equipment or the content of the receiving channel number register $I_{646}$ is set to 1 and the transmitting channel number or the content of the transmitting channel number storage register $I_{645}$ is set to 4. In the Figure, the first pattern indicates the receiving data of the transmission channel 1, the second pattern the receiving data of the transmission channel 4, the third pattern the selecting signal SIR to the receiving selector $I_{63}$ and the last pattern the output of the receiving selector $I_{63}$ or the receiving data to the access interface units via the receiving data bus RDB.

It will be seen that in the packet cell, the channel information corresponding to the content 4 of the transmitting channel number storage register are selected for the areas of the cell free/busy-condition indicator F/B, the cell circulation monitor M and the response RES and the channel information corresponding to the content 1 of the receiving channel number register are selected for the other areas. In other words, the information of the cell free/busy-condition indicator F/B and the cell circulation monitor M must be detected and transmitted by the access interface unit receiving a request for packet transmission and the information of the response RES must be transmitted by the access interface unit designated for reception. Also, the information of the other areas must be received by the access interface units designated for reception.

Thus, in accordance with the slot access method the transmitting and receiving equipment are completely separated with respect to the areas used and there is the merit of eliminating the need to provide separate information receiving and transmitting channels but combining the two in one by multiplexing.

During the reception, even if the cell free/busy-condition indicator F/B is not used, it is possible to introduce a null as the address of free cells so that it is only necessary to confirm the equality of the destination address. Also, as regards the deletion of the transmitted cells after rounding of the ring, the need to confirm the source address SA can be eliminated by means of storing the positions of the cells used or the like.

Figure 18:
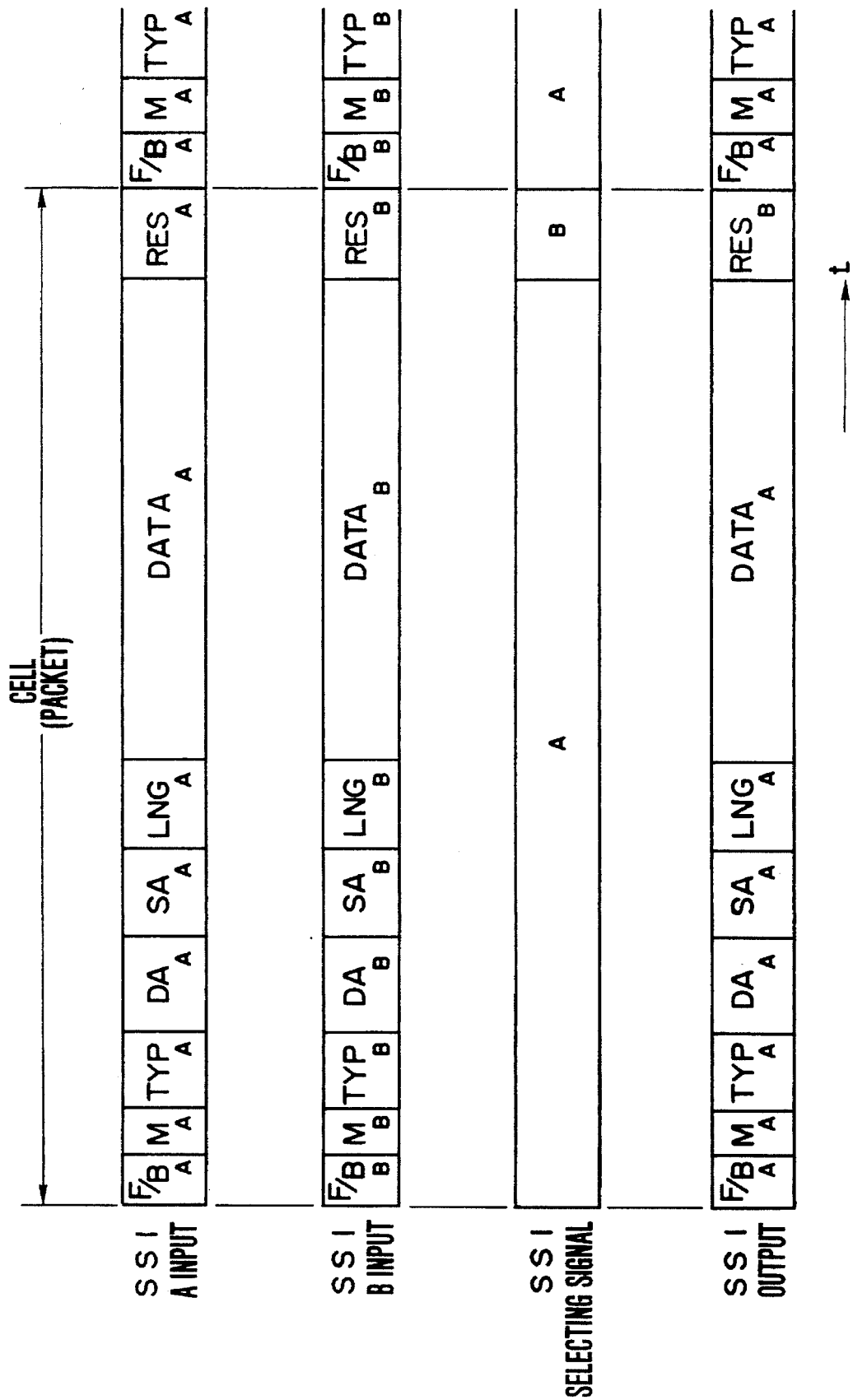

FIG. 18 is a transmission switching time chart of the packet cells on the transmission channel of the same number as the reception by the packet switching control circuit $I_{643}$.

In the Figure, the first pattern represents the A-side input information of the sending selector $I_{611}$ in FIG. 14. This pattern shows the through information of the transmission channel 1. Then, the second pattern is the B-side input information of the transmission selector $I_{611}$ and it represents the transmitting information from the transmitting information from the sending data bus SDB in the transmission bus unit $I_8$. The third pattern is the selecting signal $SS_1$ of the present selector and the fourth pattern is the output of the same selector. In these patterns, the horizontal axis direction shows the elapsed time.

Thus, it will be seen that this selector operates in such a manner that the A-side inputs or the channel-1 through information is selected for the areas other than the response area RES and the B-side transmitting information is selected for the response area RES. This is due to the fact that the access interface units connected to the present transmission equipment are set to use the transmission channel 1 for receiving purposes and therefore they are permitted to pass all the information other than that for the response area RES.

It is to be noted that the sending selectors $I_{612}$ and $I_{613}$ are not required to receive information so that the A-side inputs are selected for all the areas to simply pass the information therethrough.

Figure 19:
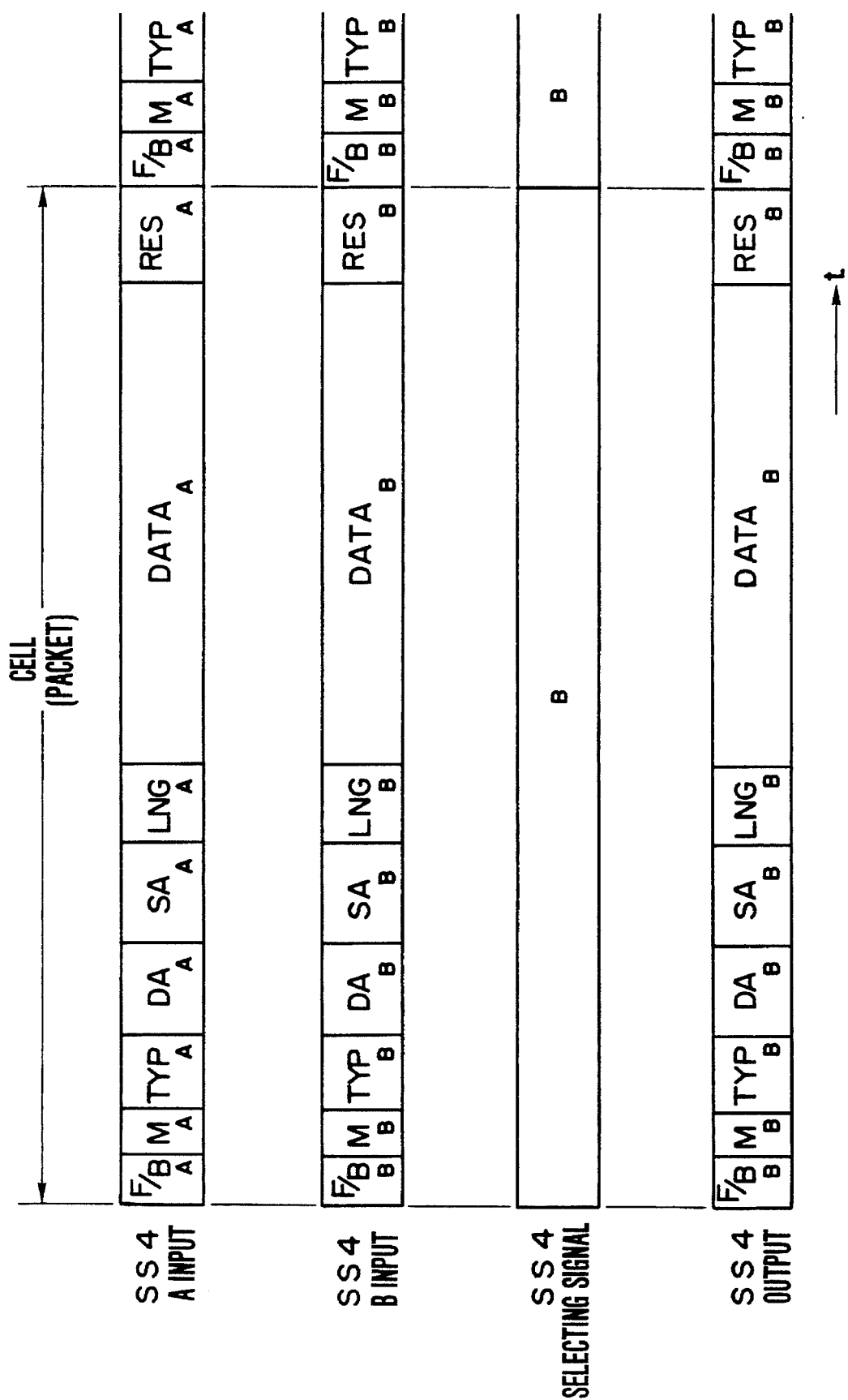

FIG. 19 is a transmission switching time chart of the packet cells on the transmission channel equal to the transmission channel number by the packet switching control circuit $I_{643}$.

In the Figure, the first pattern shows the Aside input of the sending selector $I_{614}$ or the through information of the transmission channel 4. The next pattern is the B-side input of the sending selector $I_{614}$ or the transmitting information from the transmitting data bus SDB. The third pattern is the selecting signal $SS_4$ of this selector, and the last pattern shows the output of this selector.

Thus, it will be seen that this sending selector operates in such a manner that when the present transmission equipment transmits information, it always selects the B-side input or the transmitting information from the present transmission equipment. The previously mentioned busy-condition signal SND on the control bus CTB determines whether the present transmission equipment is sending information. It is to be noted that when there is no transmission of information from the transmission equipment, the present selector always operates so as to pass the A-side input or the information taken in from the receiving unit $I_1$.

Figure 20:
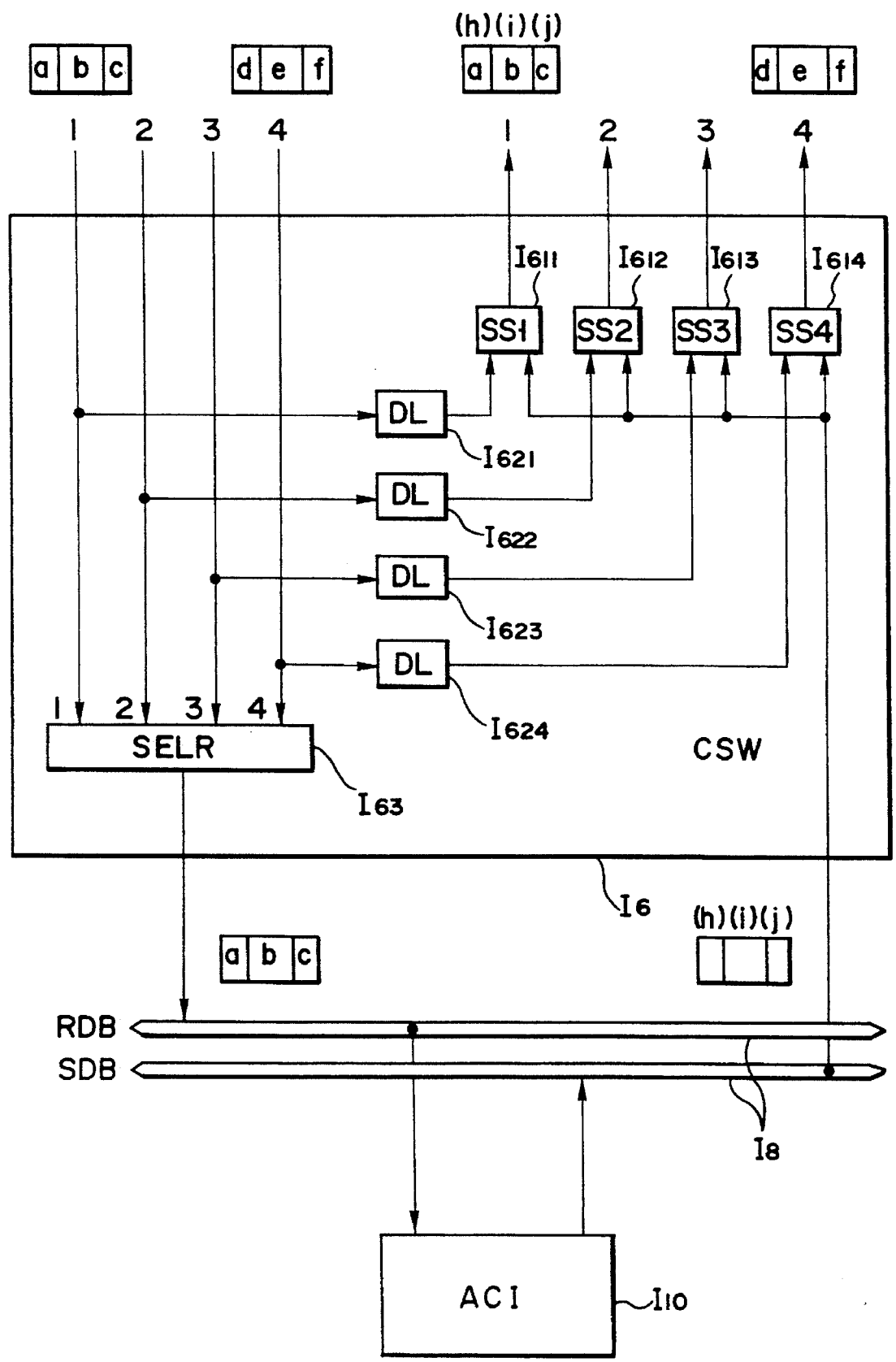
FIGS. 20, 21 and 22 are diagrams useful for explaining the switching operations of packet cells.

FIG. 20 is a diagram combining the abovementioned controls of the various parts to explain the packet cell switching operation and the channel switch unit $I_6$, the sending data bus SDB and the receiving data bus RDB of the transmission bus unit $I_8$ and the access interface unit $I_{10}$ are shown typically. The Figure shows a case where the number of channels is 4 and both of the receiving channel number or the content of the receiving channel number register $I_{646}$ and the transmitting channel number or the content of the transmitting channel number storage register $I_{645}$ are 1.

Also, the information at various locations show the packet cell and its contents are divided broadly into three areas: i) the cell free/busy-condition indicator F/B and the cell circulation monitor M, ii) the response RES and iii) the other areas. For instance, in the transmission channel 1, i) is indicated by a symbol a, ii) by c and iii) by b. Let it be assumed that these contents are designated by (a, b, c).

Assume that the input cell of the transmission channel 1 is (a, b, c) and the input cell of the transmission channel 4 is (d, e, f). The output of the receiving selector $I_{63}$ or the corresponding cell on the receiving data bus RDB becomes (a, b, c).

In this case, if these cells are not directed to the present transmission equipment and are thus ignored by its access interface unit $I_{10}$, the output of the sending selector $I_{611}$ becomes (a, b, c) and the output of the sending selector $I_{614}$ becomes (d, e, f), thereby passing these cells through the present transmission equipment. Although not shown, the same applies to the transmission channels 2 and 3.

Then, where the access interface unit $I_{10}$ has transmitting information and the input cell (a, b, c) of the transmission channel 1 is a free cell, information (h, i, j) is outputted to the sending data bus SDR and the output of the sending selector $I_{611}$ becomes (h, i, j). The other channels are the same as previously and the passage of informance is simply performed. This case is indicated by attaching parentheses at the corresponding cell position.

Although not shown in the Figure, where the access interface unit $I_{10}$ receives the input cell (a, b, c), only the answer area i is sent and thus the output of the sending selector $I_{611}$ becomes (a, b, j).

From the foregoing description it will be seen that when the receiving channel number and the transmitting channel number are the same, the access control on these channels can be performed in the same manner as the case where the number of channels is 1.

Figure 21:
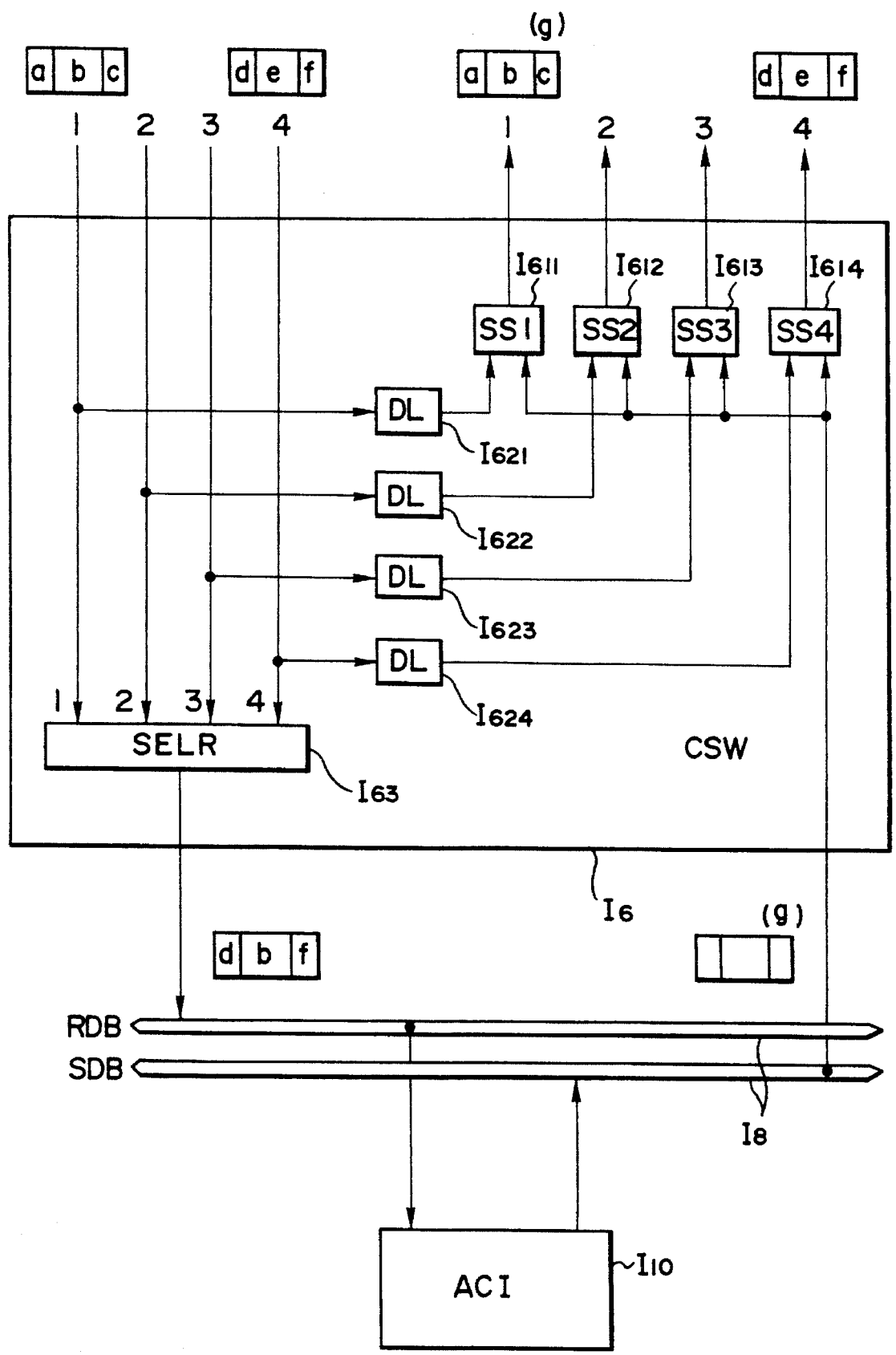

FIG. 21 is a diagram useful for explaining the switching operation of a packet cell and the illustrated case differs from the preceding case in that the content of the transmitting channel number storage register $I_{645}$ is 4 and the content of the receiving channel number register $I_{646}$ is 1. In this case, the output of the receiving selector $I_{63}$ becomes (d, b, f) representing a mixed form of the information of the transmission channels 1 and 4. In other words, the presence of information directed to the present transmission equipment is always checked by the informance b and the presence of a free slot in the channel 4 is simultaneously checked by the information d.

The Figure shows the operation performed during the reception of information so that each of the sending selectors $I_{611}$, $I_{612}$, $I_{613}$ and $I_{614}$ selects the A-side input or through information and the input and output patterns of each transmission channel become the same.

Notes that only when the access interface unit $I_{10}$ has transmitted answer information q, only the output of the sending selector $I_{611}$ changes from (a, b, c) to (a, b, g).

Figure 22:
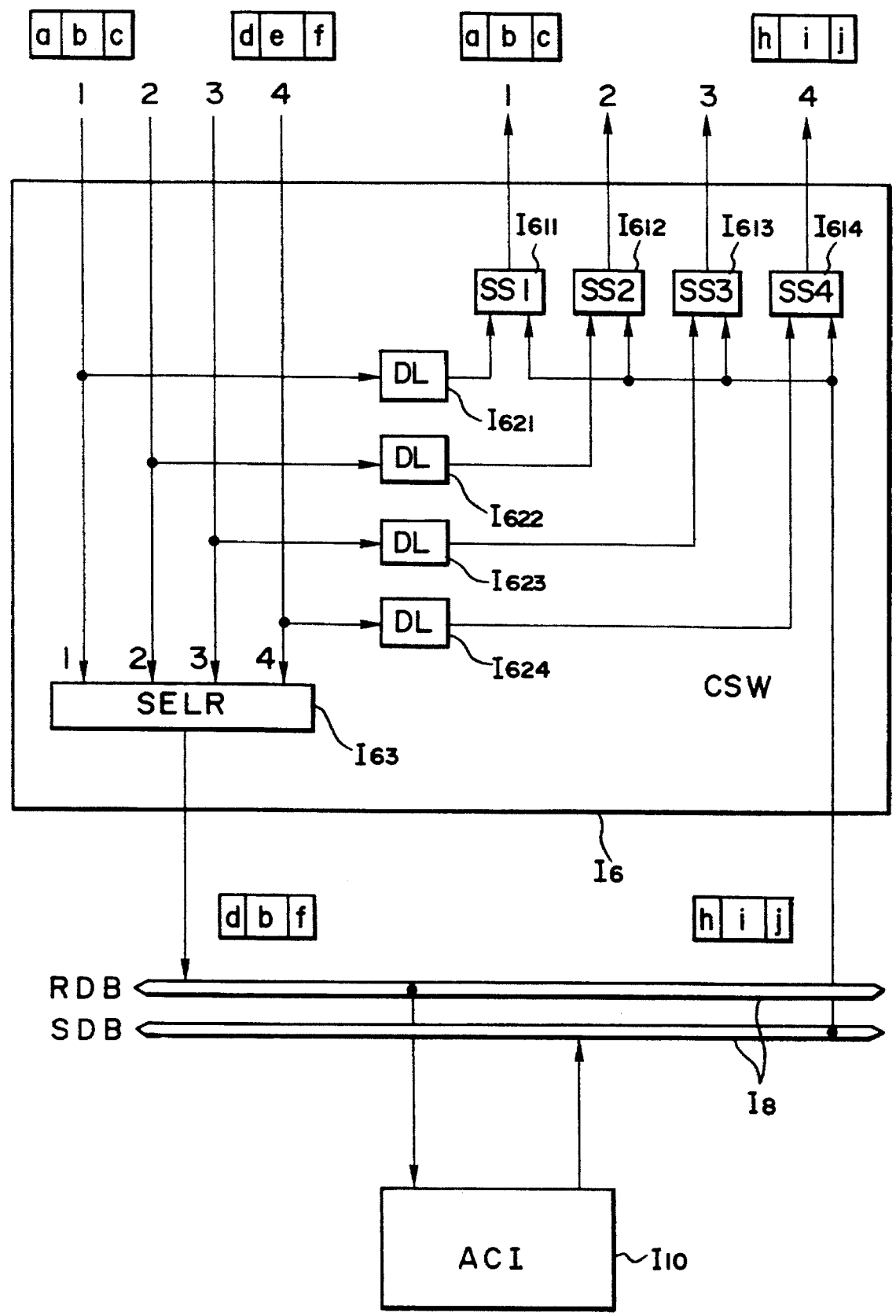

FIG. 22 is a diagram useful for explaining the switching operation of a packet cell and the Figure shows a case where the transmission of information is effected under the same conditions as the previous case.

When the input cell of the transmission channel 4 is free or in the case of the originating cell rounding the ring, the access interface unit $I_{10}$ sends a cell pattern (h, i, j) to the sending data bus SDB. In the former case, the content of the information d is judged thus sending data, whereas in the latter case, the transmission of data or the transmission of the free cells is effected in accordance with the cell position information stored during the transmission. The information sent onto the sending data bus SDB is outputted to the transmission channel 4 via the sending selector $I_{614}$.

Figure 23:
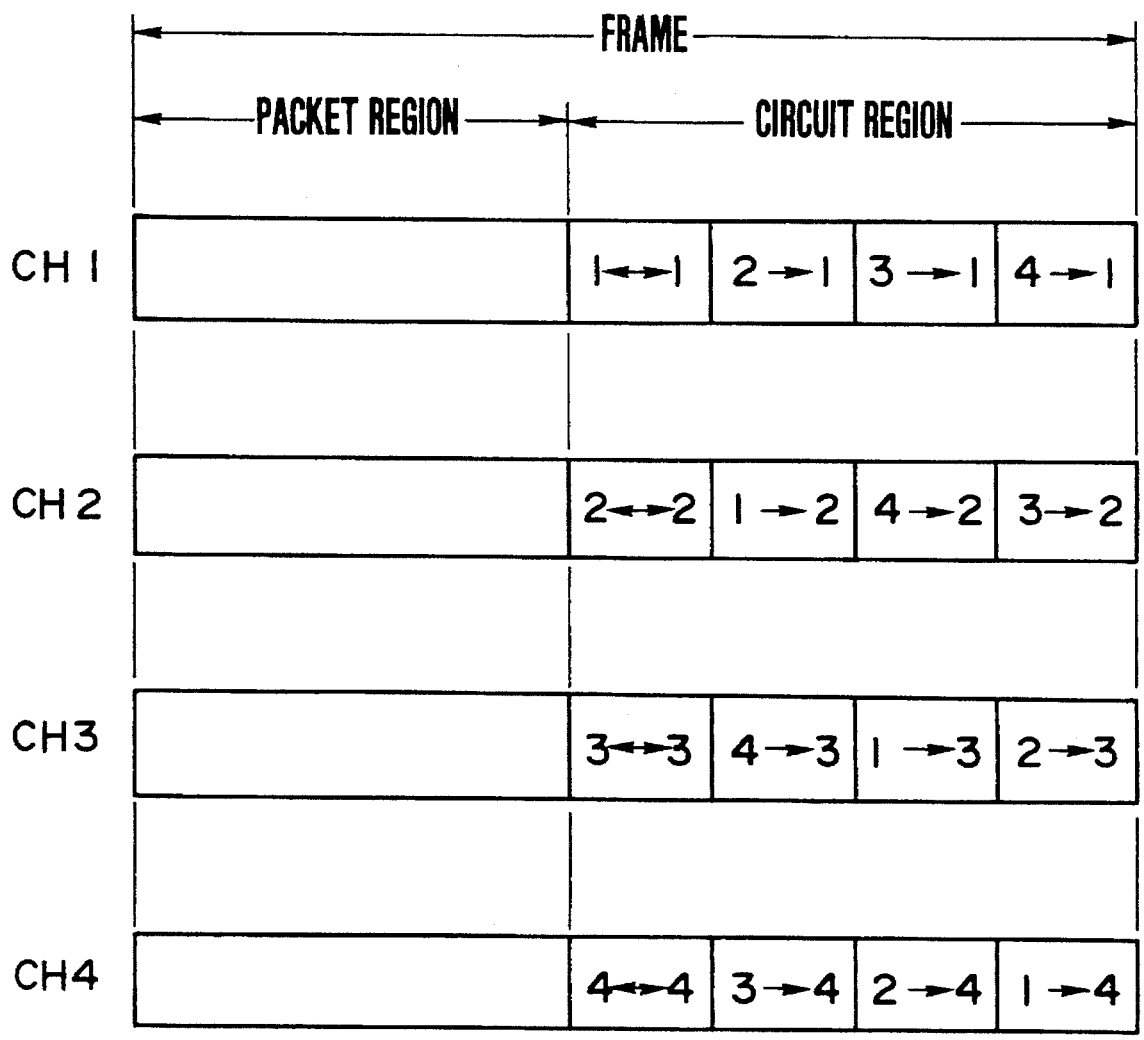
FIG. 23 is an allocation diagram showing the transmitting areas in the circuit information frame.

FIG. 23 is an allocation diagram showing the inter-frame transmission areas for circuit information. Differing from the previously explained packet information, the positions of a transmission frame where each access interface unit performs the reception and transmission are fixed by setting. From the Figure it will be seen that in the case of circuit information, the transfer of information is also possible not only between the different parts of the same transmission channel but also between the different transmission channels. More specifically, the receiving transmission channel of each transmission equipment is fixed so that in the case of the transmission equipment using any other transmission channel, the transfer of the information between the channels is effected at the sending end.

It is only necessary for each access interface unit to periodically effect the transmission and reception by using predetermined frame positions and information length (transmission rate).

Figure 24:
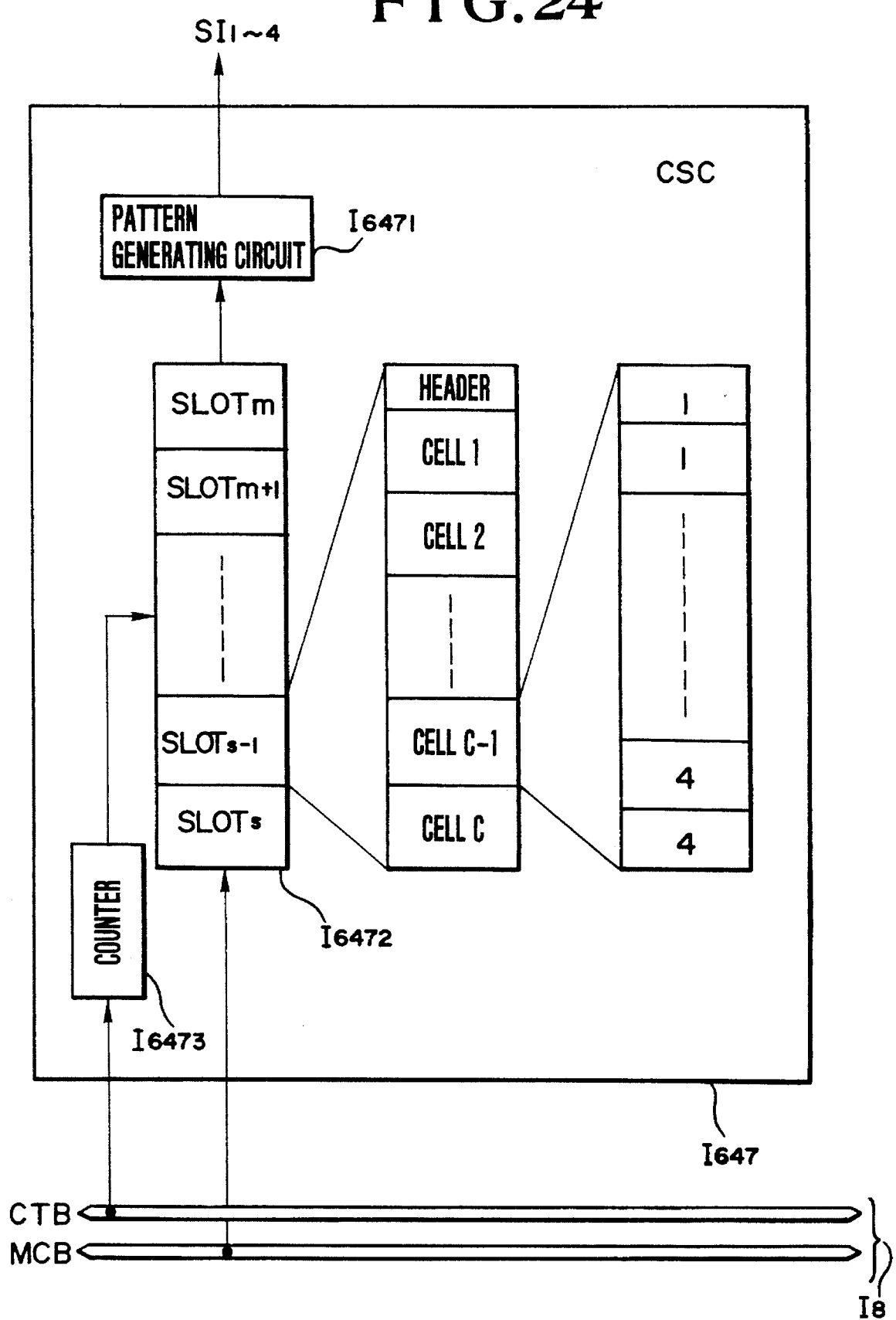
FIG. 24 is a functional block diagram of the circuit switching control circuit.

FIG. 24 is a function block diagram of the circuit switching control circuit $I_{647}$. This circuit generates selecting signals SIi for the sending selectors $I_{61}$ for the circuit information areas set in the frame. As regards a selecting signal SIR for the sending selector $I_{63}$, the content of the receiving channel number register ($I_{646}$) is permanently used as shown in FIG. 15. The function parts are as follows.

1) Circuit access memory ($I_{6472}$)

This is a two-port memory which stores a sending selector selecting signal SIi pattern in correspondence to each of the positions of a transmission frame. The setting is effected by storing what are transferred to the circuit from the processing circuit $I_{71}$ through the processor bus MCB. During the operation, the addressing is effected in response to a counter $I_{6473}$. The content read is sent to a selector control pattern generating circuit $I_{6471}$. The memory content is settable for each byte in the frame.

2) Counter ($I_{6473}$)

This counter supplies address information to the circuit access memory $I_{6472}$. In response to the transmission timing signals from the control bus CTB, the counter counts up for every byte.

3) Selector control pattern generating circuit ($I_{6471}$)

This circuit has a decoding function to change the selecting pattern coded and stored in the circuit access memory to a sending selector selecting signal.

Figure 25:
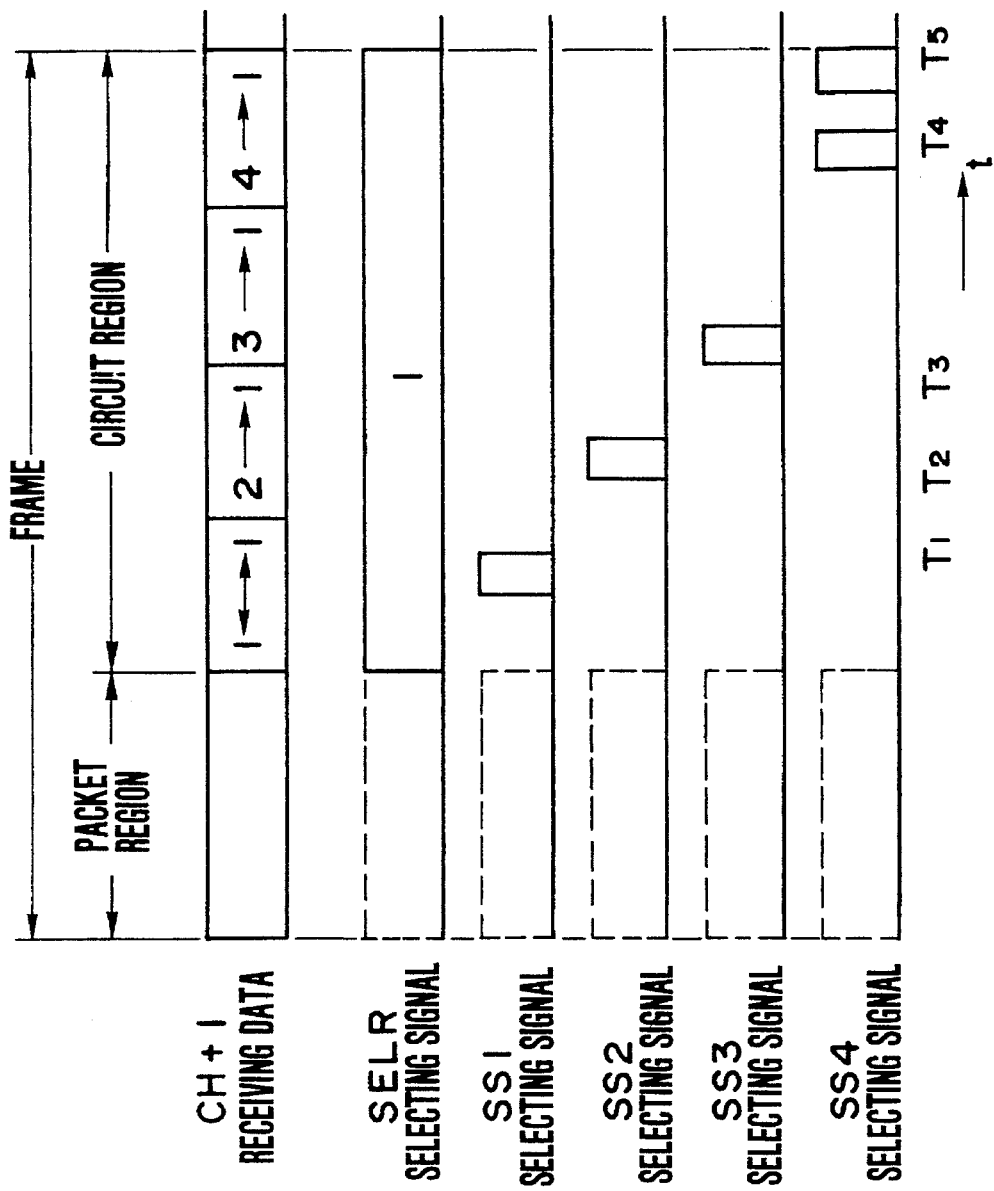
FIG. 25 is a time chart of the circuit information switching operation.

FIG. 25 shows an example of a time chart for the circuit information switching operation. The time chart shows an example of the operation of a certain transmission equipment to which the transmission channel 1 is assigned for receiving purposes. In the Figure, the first pattern shows the receiving data of the channel 1, the second pattern the selecting signal SIR of the receiving selector $I_{63}$, and third and following patterns the selecting signals $S_1, S_2, S_3$ and $S_4$ of the sending selectors $I_{61}$.

The transmission and reception of information within the transmission channel 1 are effected at a frame position $T_1$. At a frame position $T_2$, the transmitting information is sent into the channel 2 and the transmission channel 1 receives the information addressed to itself from the access interface unit assigned to the transmission channel 2.

Then, the similar operations are performed at frame positions $T_3$, $T_4$ and $T_5$. It will be seen that the transfer of circuit information between the different transmission channels can be realized in this way by using the same channel switch unit $I_6$ as used for the transfer of the packet information.

Figure 26:
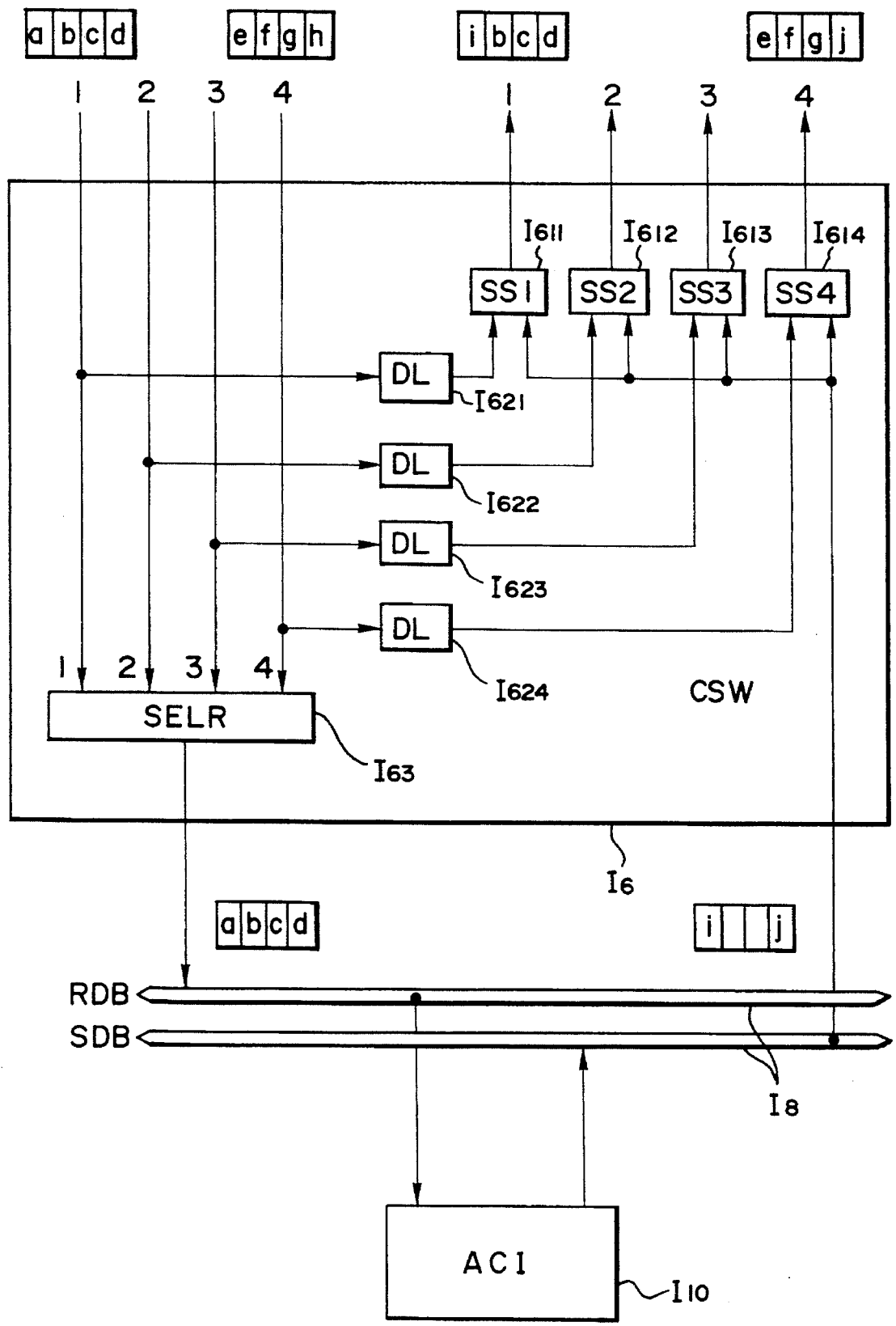
FIG. 26 is a diagram useful for explaining the circuit information switching operation.

FIG. 26 is a block diagram for explaining the switching operation of circuit information and it integrates the previously mentioned controls of the various parts. While the hardware elements are the same as in the case of FIG. 20, the information shown at the various part indicate the circuit area information in the transmission frame. The information are broadly divided into the following four parts.

i) First area (e.g., a in the Figure)

This area is assigned for the transfer of information within the transmission channel 1 and it is also used by the present transmission equipment for the purpose of transmission and reception.

ii) Second area (e.g., b in the Figure)

This area is assigned for the transfer of information within the transmission channel 1 but not by the present transmission equipment for transmitting and receiving purposes.

iii) Third area (e.g., c in the Figure)

This area is assigned for the transfer of information between the transmission channels 1 and 4 and this area is not used by the present transmission equipment for transmitting and receiving purposes.

iv) Fourth area (e.g., d in the Figure)

This area is assigned for the transfer of information between the transmission channels 1 and 4 and it is also used by the present transmission equipment for the transmission and reception. The packet areas and the transmission areas between the other channels will not be explained for purposes of simplicity.

With the present transmission equipment, the receiving transmission channel is permanently set to the channel 1 and therefore the output of the receiving selector $I_{63}$ or the information (a, b, c, d) on the receiving data bus RDB appears as such. Also, the transmission of information from the present transmission equipment is effected as i at the position corresponding to a and as j at the position corresponding to d as shown on the sending data bus SDB.

The sending selector $I_{611}$ performs the transmission of the first area only and thus its output becomes (i, b, c, d). Also, the sending selector $I_{614}$ performs the transmission of the fourth area only and thus its output becomes (e, f, g, j). With the other channels, their input information are passed as such.

Figure 27:
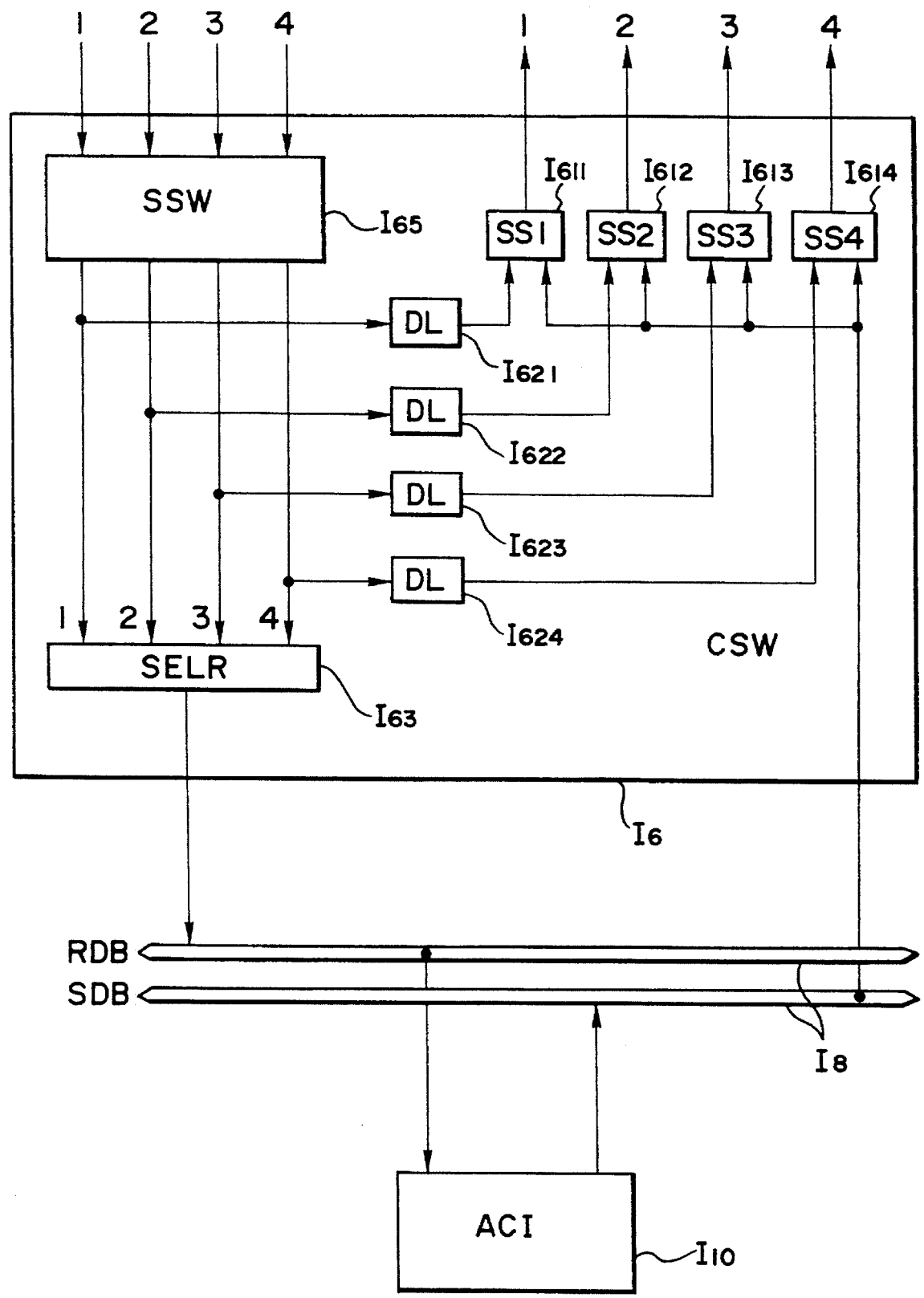
FIG. 27 is a diagram showing the hardware construction of a channel switching unit used when realizing the circuit information switching by another embodiment.

FIG. 27 is a block diagram showing the hardware construction of the channel switch unit $I_6$ used when realizing the circuit information switching by another method. This construction differs from FIG. 14 in that a spatial switch $I_{65}$ is inserted before the receiving selector $I_{63}$. This circuit is capable of interchanging information between the transmission channels and this is utilized for the transfer of circuit information between the channels. As a result, in the case of the switch control circuit $I_{64}$ which controls the receiving selector $I_{63}$ and the sending selectors $I_{61}$, it is only necessary to deal with the packet information only. Also, the spatial switch operation is usually effected collectively only within the single transmission equipment in the network. While there are various types of spatial switches, one type of these switches is the ATM (asynchronous transfer mode) switch which is used for cell interchanging purposes in the wideband ISDN (integrated services digital network) and this can be used for the purpose. In this case, the interchange is effected for every cell and the interchange operation is effected on the basis of the address information in the cells.

Figure 28:
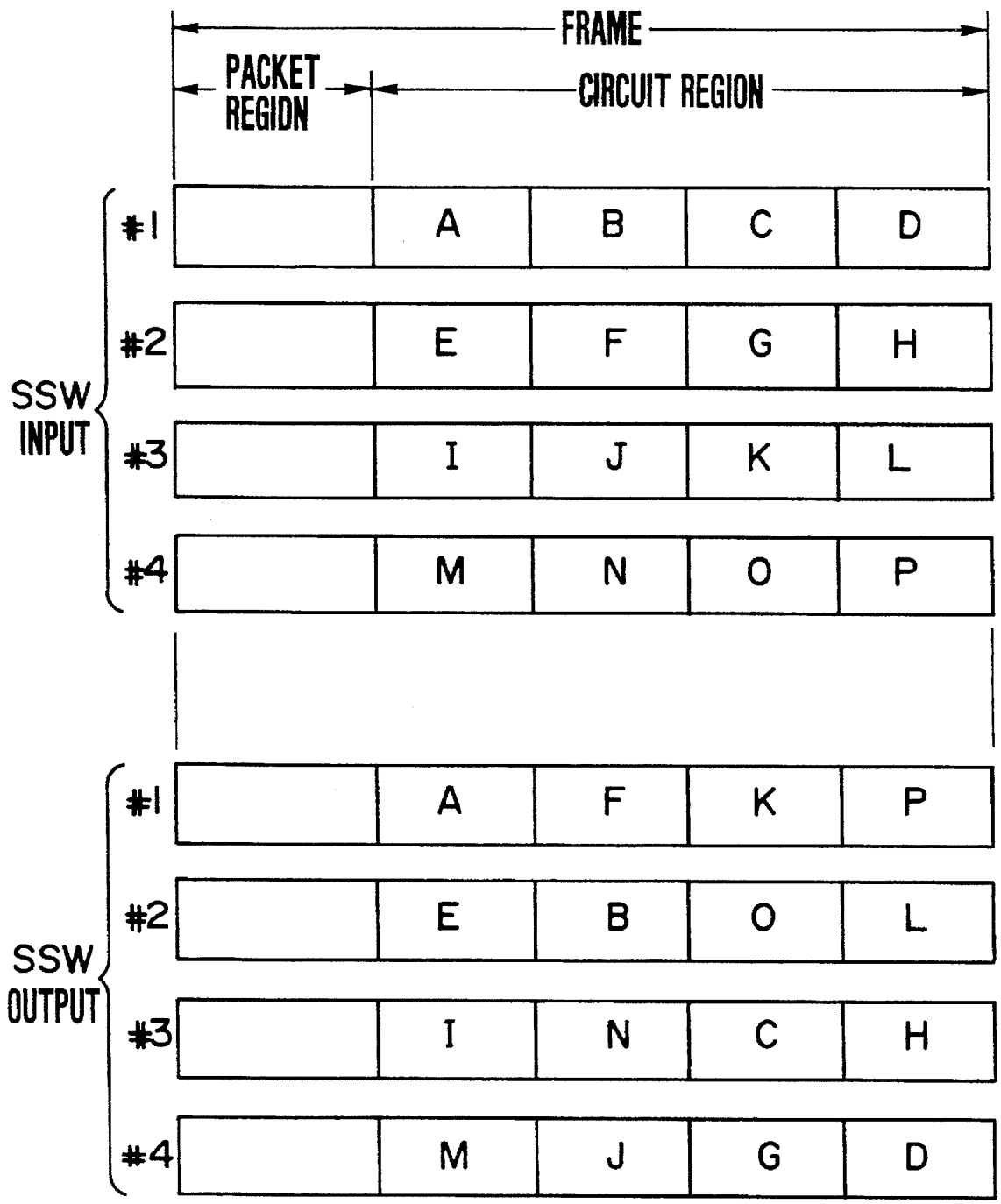
FIG. 28 is a diagram useful for explaining the operation of the spatial switch circuit.

FIG. 28 is a diagram for explaining the operation of the spatial switch circuit for the interchanging of information between the channels. In the Figure, the upper rows show a spatial switch input and the lower rows show its output.

Figure 29:
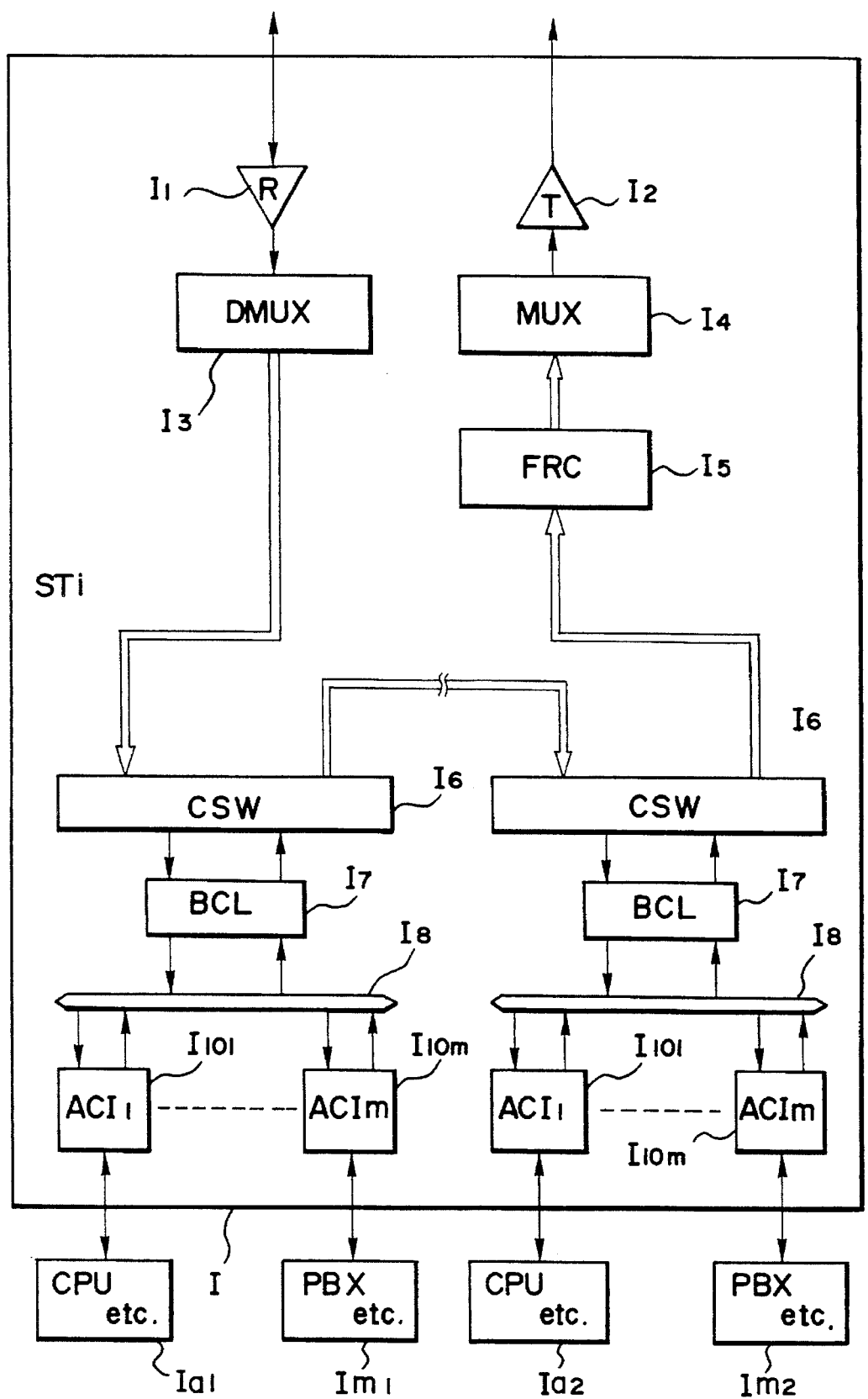
FIG. 29 is a diagram showing the hardware construction of transmission equipment used for increasing the transmission capacity.

The method of allocating the areas within the circuit region is the same as in FIG. 23. Therefore, the information in the areas A, E, I and M are assigned for the transfer of information within the transmission channel and thus no information interchanging takes place. In the other areas, however, the following interchanging of information is effected.

i) Between the channels 1 and 2—B and F ii) Between the channels 3 and 4—J and K iii) Between the channels 1 and 3—C and K iv) Between the channels 2 and 4—B and O v) Between the channels 1 and 4—D and P vi) Between the channels 2 and 3—H and L FIG. 29 is a block diagram showing an example of the hardware construction of a transmission equipment increased in transmission capacity. In the embodiment described so far by way of example, the single channel switch unit $I_6$ is included in each transmission equipment. This limits the transmission capacity accessible by each transmission equipment to that which corresponds to one transmission channel at the most. Thus, in the case of high-speed equipment or where a large number of equipment are gathered, there is possibility of the transmission capacity becoming insufficient. While this deficiency can be overcome by the method of arranging the transmission equipment in cascade, not only a number of expensive transmitting and receiving units are required but also the number of relay stages is increased, thereby increasing the deterioration in transmission quality.

Thus, as shown in the Figure, a transmission equipment is constructed so that transmitting and receiving units $I_1$ and $I_2$, multiplexing and demultiplexing units $I_3$ and $I_4$ and a frame control unit $I_5$ are used in common, and channel switch units $I_6$ and the following are connected in cascade. By virtue of this construction, the transmission capacity accessible from each transmission equipment can be used up to the capacity of the transmission line without increasing the number of relay stages.

Figure 30:
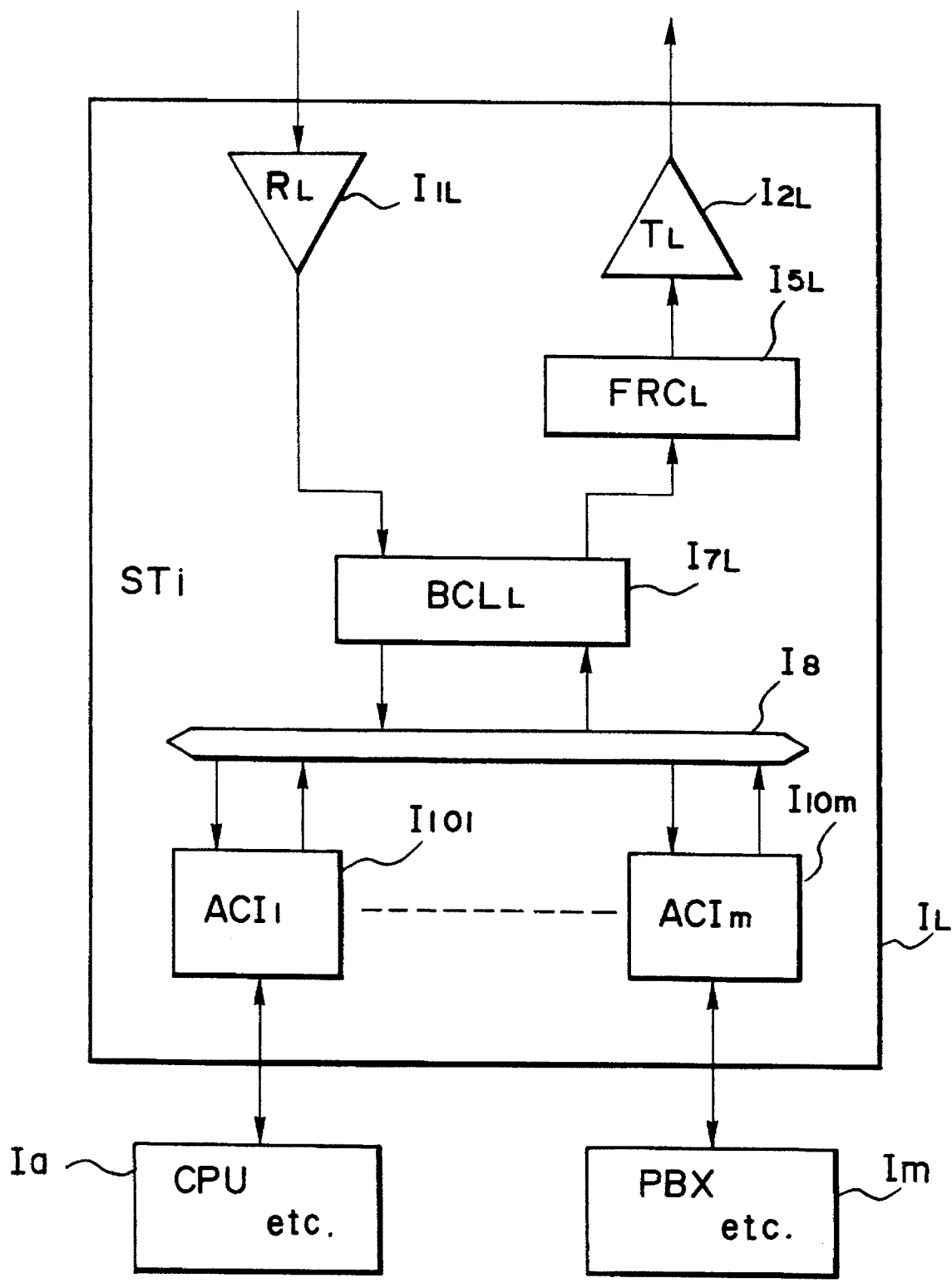
FIG. 30 is a diagram showing the hardware construction of transmission equipment when the number of transmission channel is 1.

FIG. 30 shows the hardware construction of each transmission equipment used in a case where the number of transmission channels is 1. It is convenient to construct the transmission equipment by the building block system which clearly divides its component parts into those which are dependent on the transmission line speed and others which are not so thereby allowing it to meet a variety of needs. A description will be made of the necessary changes due to the change of application from the previously mentioned system using the plurality of transmission channels to a system using a single transmission channel.

In a transmission equipment $I_L$ with a transmission line including a single transmission channel, transmitting and receiving units $I_{1L}$ and $I_{2L}$, a frame control unit $I_{5L}$ and a bus control unit $I_{7L}$ must be changed. The other function units are used as such as previously. The transmitting and receiving units operate at a lower speed than in the case of FIG. 3. The frame control unit corresponds to a case where the number of channels is 1 as compared with the case of FIG. 7. The bus control unit requires the addition of a control for the passage of information between the sending and receiving data buses to the construction of FIG. 9.

Figure 31:
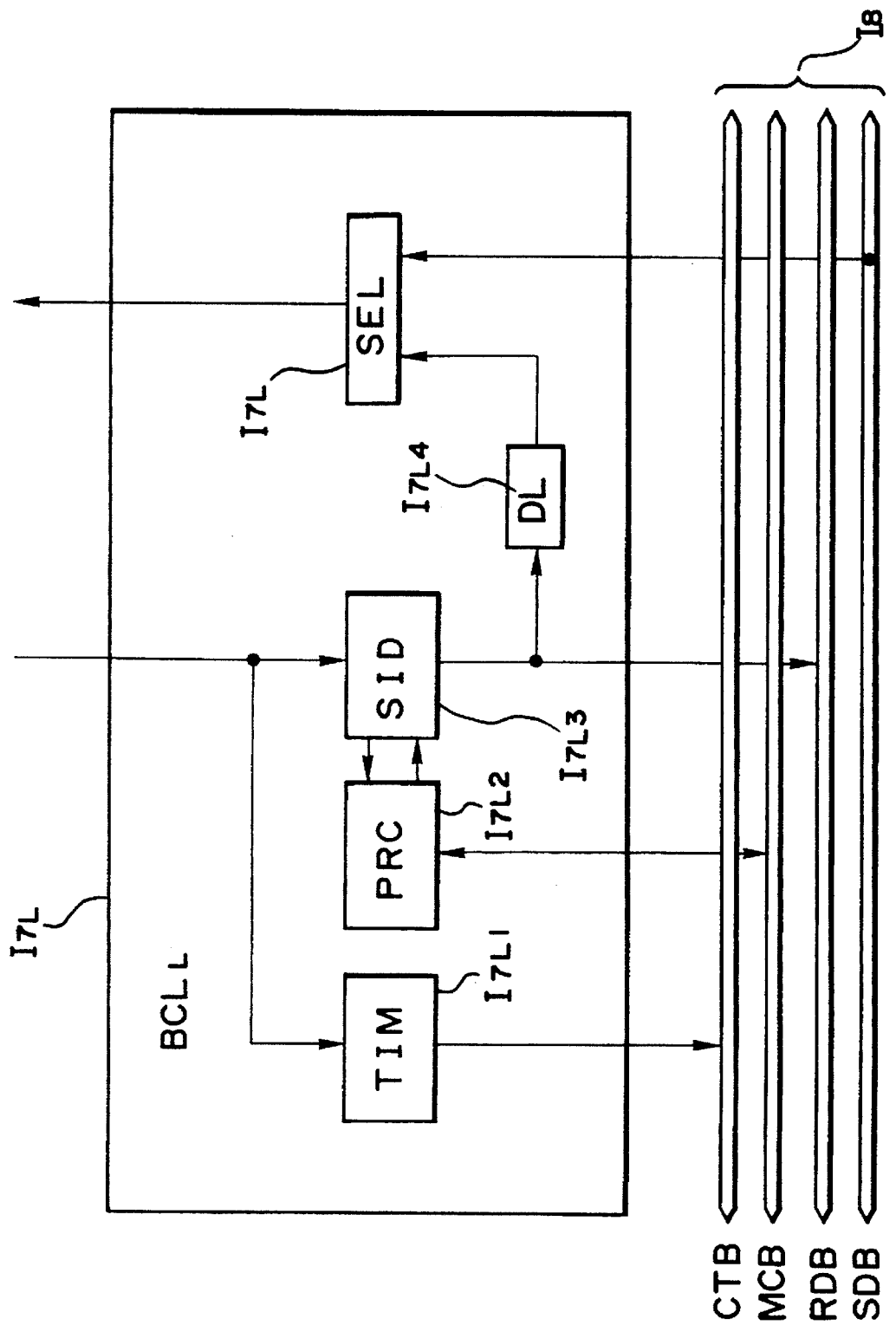
FIG. 31 is a block diagram showing the hardware of the bus control unit when the number of transmission channels is 1.

FIG. 31 shows the hardware construction of the bus control unit $I_{7L}$ in the transmission equipment having the transmission line including the single transmission channel. In addition to the function parts shown in FIG. 9, an element $I_{7L4}$ and an element $I_{7L5}$ respectively corresponding to the delay circuits and the sending selectors of FIG. 14 are added to provide an information passing path from the receiving data bus RDB to the sending data bus SDB. The control of the selector $I_{7L5}$ is effected through the control bus CTB by the access interface unit which transmit information so that it operates so as to bypass the information on the sending data bus SDB in the presence of transmitting information and to bypass the receiving information in the reverse case.

FIG. 32 shows an example of a transmission format used in a case employing a token passing method for the access control of packet information. A format is used which is based on the FDDI (fider distributed data interface) under standard investigation by the X3T9.5 Committee of ANSI. Differing from the previously described slot access method, a free token which is information denoting a ready for sending is circulated through the ring transmission line so that any of the access interface units detecting and acquiring the free token is allowed to transmit packet information which is called a frame. Immediately after the completion of the transmission, the free token information is regenerated and also the packet information sent from the present equipment is eliminated after it has rounded the ring.

The detailed definitions of the respective information are as follows.

1) Preamble (PA)
This is arranged at the head of information to correct the bit synchronization at the receiving end.
2) Start delimiter (SD)
This indicates the starting position of information.
3) End delimiter (ED)
This indicates the end position of information. Different patterns are used for the token and the frame.
4) Frame control (FC)
This indicates the type of frame information.
5) Destination address (DA)
This is used for identifying the destination transmission equipment of frame information.
6) Source address (SA)
This is used for identifying the source transmission equipment of frame information.
7) Frame check sequence (FCS)
An error detecting addition code for frame information.
8) Frame status (FS)
An area provided for the purpose of informing various receiving statuses from the receiving transmission equipment.

Where the token passing is performed in a network including a plurality of transmission channels, there exists token information for each channel so that during packet transmission, the transmission is effected after the sending right on the transmission channel to which the destination transmission equipment is connected is obtained. Since all the information directed to this equipment are transferred over the initially assigned transmission channel, it is only necessary to permanently search this channel for information receiving purposes. The switching timing of the transmitting channels must be made upon completion of the ring rounding and deletion of the originating frame.

Figure 33:
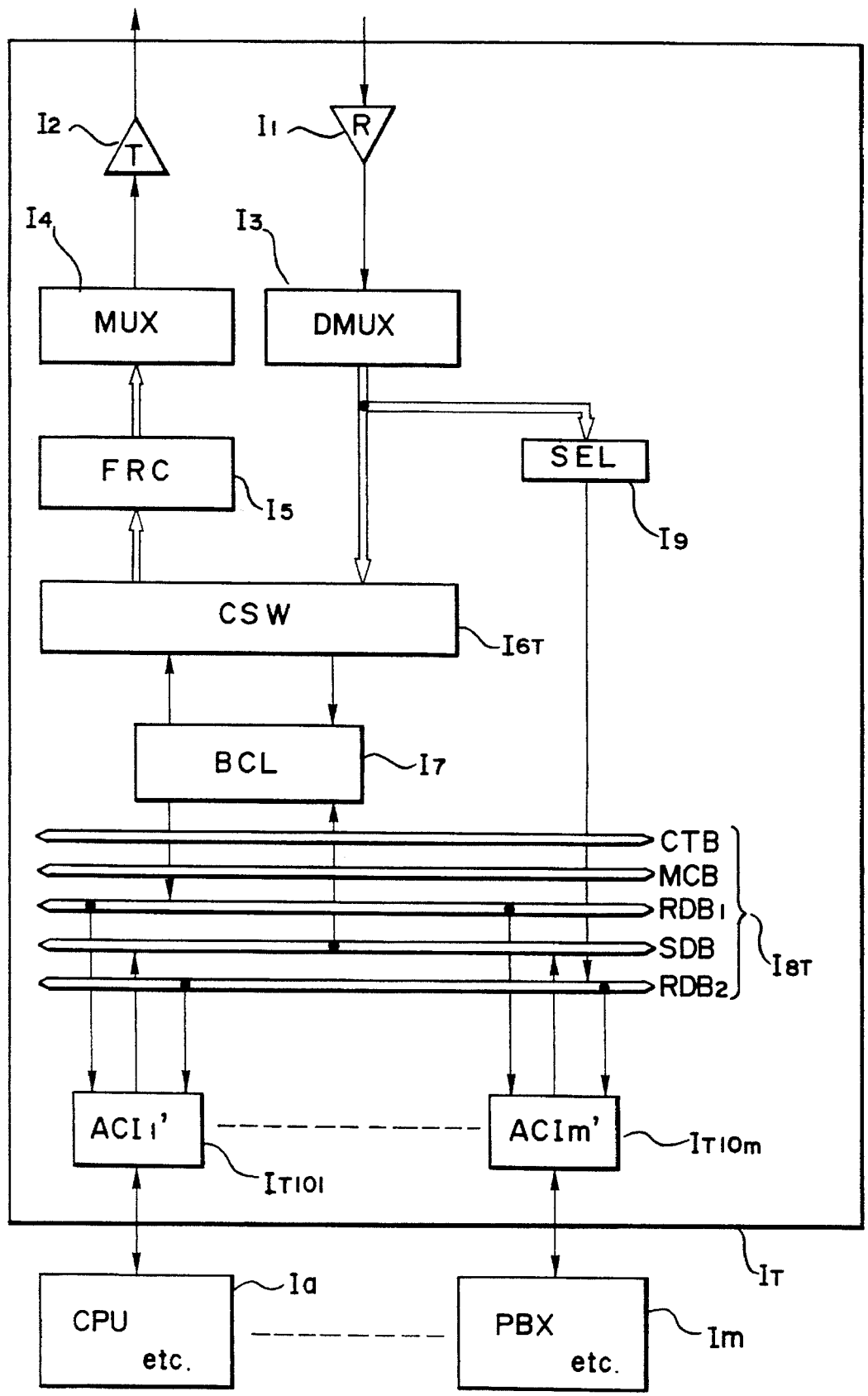
FIG. 33 is a diagram showing the hardware construction of transmission equipment employing the token passing control.

FIG. 33 shows the hardware construction of a transmission equipment employing the token passing for the access control of packet information. Differing from the previously mentioned slot access method, an information receiving channel and a channel on which a free token is searched for information transmitting purposes cannot be combined in one by multiplexing and therefore two separate receiving channels are required. This transmission equipment differs in this respect from the construction of FIG. 3 and there is added a selector $I_9$ for selecting one of a plurality of receiving channels from a demultiplexing unit $I_3$ or the one assigned for reception. Also, two separate receiving data buses $RDB_1$ and $RDB_2$ must correspondingly provided in place of the receiving data bus RDB and also the respective access interface units are changed correspondingly. In other words, in addition to the receiving processing performed in response to the data from the bus $RDB_1$, the access interface unit performs the token access processing (hold/release of transmission right by token) in response to the data from the bus $RDB_2$ in the destination channel. Note that there is no change with respect to the processing of circuit information and it is performed as mentioned previously.

Figure 34:
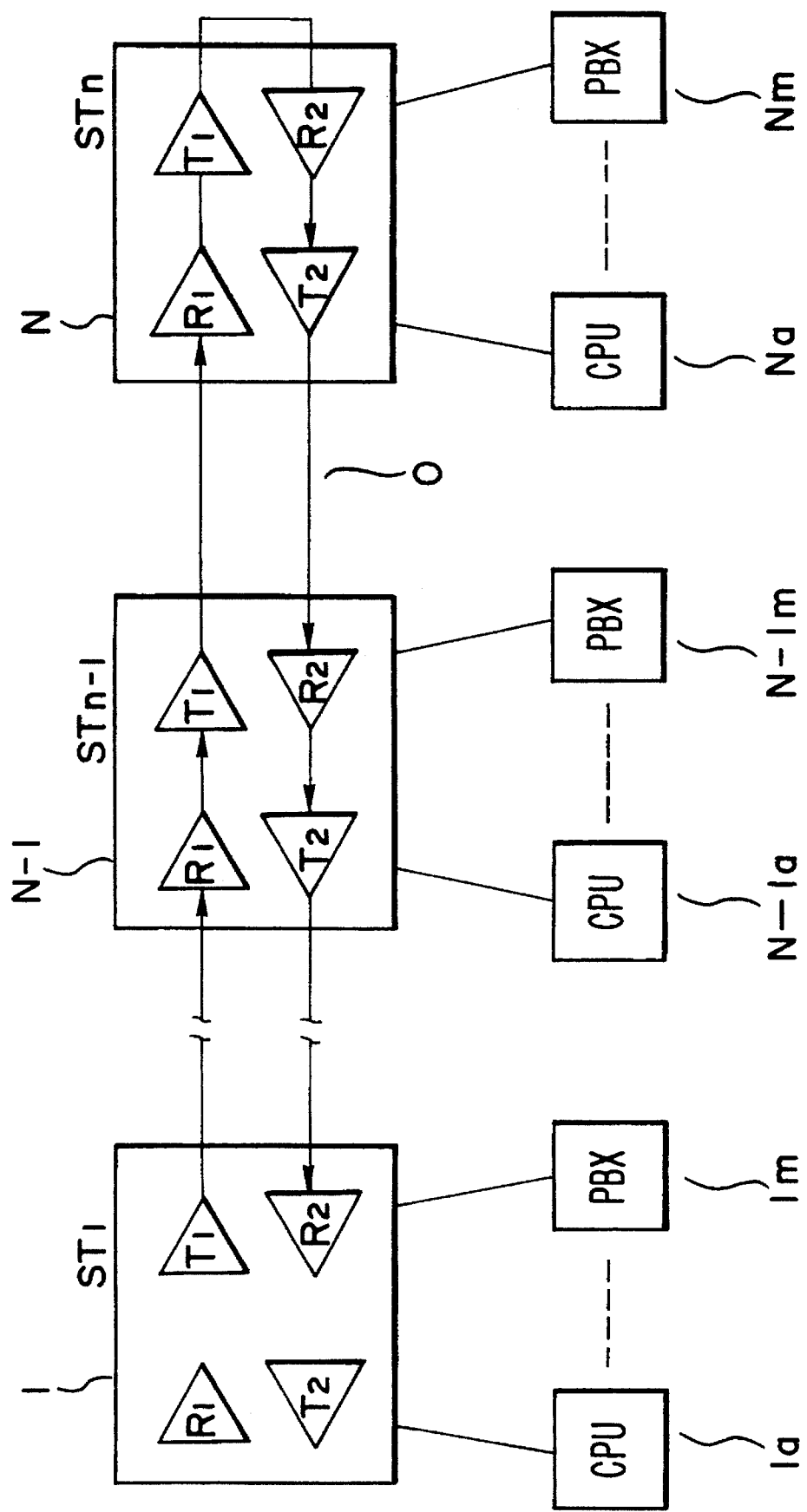
FIG. 34 is a system block diagram of the bus-type network.

FIG. 34 shows the system construction of a network in the form of a bus (open ring). In this form, the transmission operation is performed in such a manner that the transmission equipment at one end generates a transmission frame and the transmission equipment at the other end returns it. The transmission equipment arranged intermediary between the two transmit information over the down circuit and receive information over the up circuit. As a result, while two or up and down systems of transmitting and receiving units are required despite the single system network, there is the effect of eliminating such functions as the rounding delay control of the ring transmission line and the rounding and elimination of transmitting information. While the packet access control used may take the form of a slot taken passing, it is necessary to use two systems of receiving transmission channels as in the case explained in connection with FIG. 33.

Figure 35:
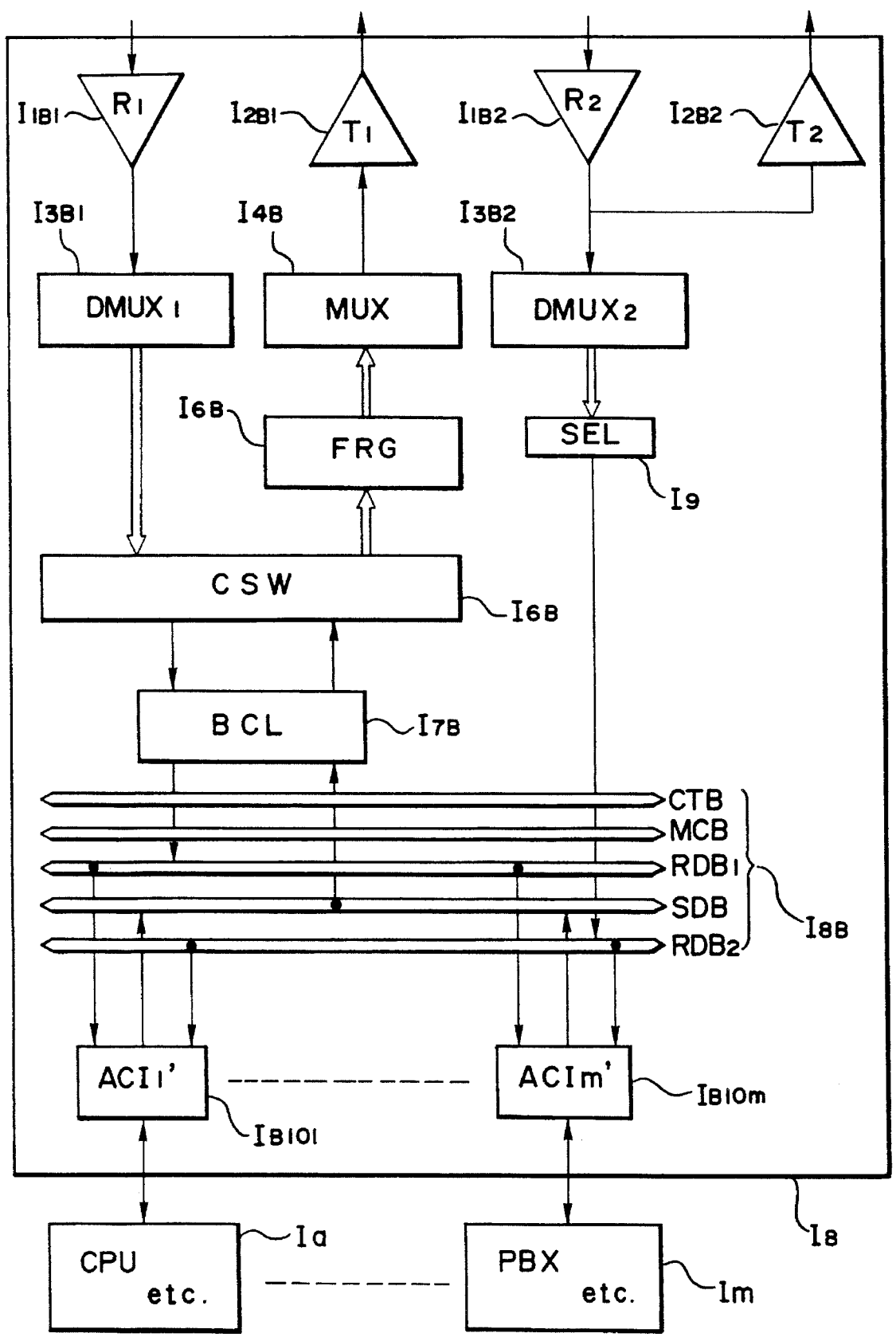
FIG. 35 is a block diagram showing the hardware of transmission equipment in the bus-type network.

FIG. 35 shows the hardware construction of transmission equipment used in the bus-type network. An exclusive up receiving transmission line is added to the construction shown in FIG. 3. In other words, there are additionally provided transmitting and receiving units $I_{1B2}$ and $I_{2B2}$, a demultiplexing unit $I_{3B2}$ and a selector $I_9$ which selects predetermined one of a plurality of receiving channels from the demultiplexing unit $I_{3B2}$. As in the case of FIG. 33, it is necessary to provide two systems of receiving data buses and access interface receiving units, respectively. It is to be noted that a frame control circuit $I_{SB}$ is required to have a pattern generating function only as mentioned previously.

We claim:

1. A network system comprising:

a transmission line including a plurality of transmission channels;

a plurality of transmission equipment connected to said transmission line to transmit and receive information from each other; and a plurality of devices connected to each transmission equipment to effect transfer of information between said devices via said plurality of transmission equipment and said transmission line, each transmission equipment including:

a receiving transmission channel which is fixedly assigned to one of said plurality of transmission channels, a demultiplexing unit for separating an input signal from said transmission line into a plurality of transmission channels, at least one channel switch unit for receiving the plurality of transmission channels, outputting information inputted from said receiving transmission channel which is selected from said plurality of separated transmission channels to one of said devices connected to said transmission equipment assigned to receive said selected receiving transmission channel, and receiving transmitting information from said one device to form an information sending channel and combining the same with other information sending channels to form a plurality of sending transmission channels, means for selecting one of said plurality of transmission channels as the sending transmission channel which is fixedly assigned to the receiving transmission channel of a destination transmission equipment, and a multiplexing unit for receiving the plurality of sending transmission channels from said channel switch unit and multiplexing said plurality of sending transmission channels to generate an output.

2. A network system according to claim 1, wherein said transmission line includes a plurality of multiplexed low-speed channels, and wherein each transmission equipment is operable at said low-speed channel speed.

3. A network system according to claim 1, wherein the transfer of information between said transmission channels in each transmission equipment is effected in a manner that the reception of information from other transmission equipment is effected through one of said receiving transmission channels assigned to said transmission equipment and the transmission of information from said transmission equipment to the other transmission equipment is effected by sending the same to one of said sending transmission channels assigned to information addressed to one of said transmission equipment.

4. A network system according to claim 1, wherein receiving information inputted from said channel switch unit by said selected receiving transmission channel connected to said one device connected to each said transmission equipment is transmitting information addressed to each said transmission equipment, and wherein input information passed through said channel switch unit is transmitting information addressed to any other of said plurality of transmission equipment.

5. A network system according to claim 1, wherein said transmission line is in the form of a ring.

6. A network system according to claim 1, wherein said transmission line is formed into an open ring shape having a plurality of open ring transmission lines, and wherein in each transmission equipment, said demultiplexing unit and said multiplexing unit are connected to one of said open-ring transmission lines heading in one direction, and there are further provided a second demultiplexing unit connected to the other of said open-ring transmission lines heading in an opposite direction to separate a receiving signal received from said other of said open ring transmission lines into a plurality of transmission channels to output one of said plurality of channels assigned to each transmission equipment as a receiving transmission channel to said one device connected thereto, and a selector for bypassing the remainder of said transmission channels to the other of said open ring transmission lines heading in opposite direction.

7. A network system according to claim 1, further comprising a spatial switch for receiving the plurality of receiving transmission channels from said demultiplexing unit to effect an inter-channel circuit information interchange in accordance with a predetermined circuit information interchange pattern to generate an output whereby said spatial switch performs an inter-channel information interchange on the circuit information in said receiving channel input information, and a detection circuit for detecting one of said transmission channels to which addressed one of said transmission equipment is connected in accordance with destination information of a packet cell whereby an inter-channel transfer of packet information is effected by said detection circuit.

8. A network system according to claim 1, wherein a plurality of said channel switch units are connected in cascade, and wherein a plurality of devices are connected to each of said channel switch units.

9. A network system according to claim 1, wherein said transmission line includes a single channel.

10. A network system according to claim 1, wherein said channel switch unit comprises:

switch control means which includes:

a detection circuit for detecting a signal denoting a destination one of said transmission equipment which signal is included in a receiving signal, a packet switching control circuit responsive to an output of said detection circuit to effect packet switching, circuit switch means storing a transmitting channel information switching pattern for said receiving channel assigned for said destination transmission equipment, channel select means for selecting information to be output to one of said devices which is divided into a transmission area used for transmission and a reception area used for reception, and synthesizing means for selecting information of said receiving area from said receiving transmission channel and said transmitting area from the sending transmission channel assigned for the receiving transmission channel of said destination transmission equipment, and synthesizing the information.

11. A network system according to claim 10, wherein transmitting information handled by each said transmission equipment is a circuit signal, and wherein said switch control means sends circuit information to said destination transmission equipment.

12. A network system according to claim 10, wherein the signal handled by each said transmission equipment is a packet signal, and wherein said detection circuit of said switch control means detects one of said plurality of channels to which said destination transmission equipment is connected in accordance with destination information in a packet cell.

13. A network system according to claim 12, wherein a token is added to said packet signal, and further including a selector for receiving, in parallel with said channel switch unit, the plurality of receiving transmission channels sent from said demultiplexing unit to select one of said channels assigned as a receiving channel to each said transmission equipment and output the same to one of said connected devices.

14. A network system according to claim 12, wherein said switch control means further includes a number storage register for storing an assigned receiving transmission channel number of a destination transmission equipment whereby when the transmission channel number of said destination transmission equipment outputted from said detection circuit does not coincide with the content of said number storage register, Said packet switching control circuit request to said connected device for retransmission of the transmitting information.

15. A network system according to claim 12, wherein when said detection circuit detects a plurality of receiving transmission channels of destination transmission equipment, said switch control means transmit information in sequence according to said plurality of receiving transmission channels of destination transmission equipment.

16. A network system according to claim 12, wherein the information to be outputted to said transmission line is divided into transmission areas used for transmission and reception areas used for reception whereby said channel switch unit selects for said transmission areas receiving channel information of said transmission channel assigned as a receiving channel to said destination transmission equipment and selects for said information from said channel assigned for reception to said transmission equipment.

17. A network system comprising:
a transmission line including a plurality of transmission channels; and
a plurality of transmission equipment connected to said transmission line to transmit and receive information from each other, wherein one of said plurality of transmission channels is fixedly assigned to each of said transmission equipment as a receiving transmission channel for receiving information from an other transmission equipment by a same transmission channel fixedly assigned as the receiving transmission channel, and
wherein transfer of information between said plurality of transmission equipment is effected such that receiving of information is effected by using one of said plurality of transmission channels fixedly assigned to each transmission equipment as the receiving transmission channel for receiving information from the other transmission equipment by using the same transmission channel, and sending of information is effected by using one of said plurality of transmission channels fixedly assigned to destination transmission equipment as the receiving transmission channel.

18. A network system according to claim 17, wherein said network is a ring-shaped or a bus-shaped network.

19. A network system according to claim 17, wherein transmission of information of each of said transmission equipment is effected such that each of the channels takes a same frame format and transmitting position is predetermined, and transmission of information is effected such that information is transmitted from said predetermined position to the receiving transmission channel of the destination transmission equipment.

20. A network system according to claim 17, wherein transmission of information between said transmission equipment is effected by each of the transmission channel taking a same frame format, and assigning transmission position of each of said transmission equipment predeterminedly, and a same transmission position information between said transmission channel is exchanged.

21. A network system comprising:
a transmission line including a plurality of transmission channels; and
a plurality of transmission equipment connected to said transmission line to transmit and receive information from each other, wherein one of said plurality of transmission channels is fixedly assigned to each of said transmission equipment as a receiving transmission channel, and
wherein transfer of information between said plurality of transmission equipment is effected such that receiving of information is effected by using one of said plurality of transmission channels fixedly assigned to each transmission equipment as the receiving transmission channel, and sending of information is effected by using one of said plurality of transmission channels fixedly assigned to destination transmission equipment as the receiving transmission channel;
wherein the transfer of information between said transmission channels in each of said transmission equipment is effected in a manner such that the transmission of information is effected by obtaining transmission right of the receiving transmission channel of the destination transmission equipment.

22. A network system according to claim 21, wherein obtaining the transmission right is effected by way of cell access or token pass.

23. A network system according to claim 22, wherein in the event for obtaining the transmission right by way of cell accessing, separating information in the cell into areas used for transmission and receiving, cell information supplied to access execution portion composed of an area used for transmission is structured by information sent from the receiving transmission channel of destination transmission equipment, and an area used for receiving is structured by information from a receiving transmission channel of own transmission equipment.

24. A network according to claim 21, wherein detection of the receiving transmission channel by said destination transmission equipment is effected by way of a destination address information included in the transmission information.

25. A network system according to claim 24, wherein each of said transmission equipment stores the receiving transmission channel by said destination transmission equipment, and compares it with a receiving transmission channel detected from destination address information included in a new transmission information, and the transmission equipment requests retransmission to the destination transmission equipment when the result of the comparison does not coincide.

26. A network system according to claim 24, wherein in the event the receiving transmission channel used by said destination transmission equipment is addressed which is detected from destination address in the transmission information is plural, then the transmission information is transmitted sequentially by using all the plural receiving transmission channels.

27. A network system comprising:

a transmission line including a plurality of transmission channels; and a plurality of transmission equipment connected to said transmission line to transmit and receive information from each other, wherein one of said plurality of transmission channels is fixedly assigned to each of said transmission equipment as a receiving transmission channel, and wherein transfer of information between said plurality of transmission equipment is effected such that receiving of information is effected by using one of said plurality of transmission channels fixedly assigned to each transmission equipment as the receiving transmission channel, and sending of information is effected by using one of said plurality of transmission channels fixedly assigned to destination transmission equipment as the receiving transmission channel;

wherein each of said transmission equipment includes a demultiplexing unit for separating an input signal from said transmission line into a plurality of receiving transmission channels, a channel switch unit for receiving the plurality of receiving transmission channels and outputting a selected one of said receiving transmission channels to a connecting device connected to said transmission equipment and said channel switch unit is connected in cascade by plural.

* * * * *